(12) United States Patent
Maltais

(10) Patent No.: US 7,997,372 B2
(45) Date of Patent: *Aug. 16, 2011

(54) SNOWMOBILE AND FEATURES THEREOF ALLOWING FOR DIFFERENT TUNNEL WIDTHS

(75) Inventor: Hugues Maltais, Valcourt (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/844,326

(22) Filed: Jul. 27, 2010

(65) Prior Publication Data

US 2010/0288572 A1 Nov. 18, 2010

Related U.S. Application Data

(60) Continuation of application No. 12/476,791, filed on Jun. 2, 2009, now Pat. No. 7,789,184, which is a division of application No. 11/671,694, filed on Feb. 6, 2007, now Pat. No. 7,753,154.

(51) Int. Cl.
*B62M 27/02* (2006.01)
(52) U.S. Cl. ...................................... 180/190
(58) Field of Classification Search .................. 180/190, 180/311, 68.4
See application file for complete search history.

(56) References Cited

U.S. PATENT DOCUMENTS

| | | | |
|---|---|---|---|
| 5,607,026 A | 3/1997 | Rioux et al. | |
| 5,685,387 A | 11/1997 | Rioux et al. | |
| 6,032,754 A | 3/2000 | Izumi et al. | |
| 6,880,659 B2 | 4/2005 | Yamamoto | |
| 6,926,107 B2 * | 8/2005 | Nishijima | 180/190 |
| 6,929,081 B2 | 8/2005 | Pichler et al. | |
| 6,942,051 B2 | 9/2005 | Mallette et al. | |
| 7,059,440 B1 | 6/2006 | Berg et al. | |
| 7,159,680 B2 | 1/2007 | Pichler et al. | |
| 7,198,127 B2 | 4/2007 | Yatagai et al. | |
| 7,303,037 B2 | 12/2007 | Yatagai et al. | |
| 7,469,764 B2 | 12/2008 | Girouard et al. | |
| 2004/0040768 A1 | 3/2004 | Yamamoto | |
| 2004/0182624 A1 | 9/2004 | Yatagai et al. | |
| 2007/0062751 A1 * | 3/2007 | Rasidescu et al. | 180/190 |
| 2007/0089920 A1 | 4/2007 | Kelahaara | |

* cited by examiner

*Primary Examiner* — Tony H. Winner
(74) *Attorney, Agent, or Firm* — Osler, Hoskin & Harcourt LLP

(57) ABSTRACT

A family of snowmobiles having different tunnel widths is disclosed. A snowmobile having spacers between the tunnel and the sides of the engine compartment and a method of manufacturing such a snowmobile are also disclosed. A snowmobile having a countershaft which is disposed rearwardly of the engine, vertically higher than the air intake opening, and forwardly of the air intake controller is also disclosed.

20 Claims, 19 Drawing Sheets

SNOWMOBILE AND FEATURES THEREOF ALLOWING FOR DIFFERENT TUNNEL WIDTHS

CROSS-REFERENCE

The present application is a continuation of U.S. patent application Ser. No. 12/476,791, filed Jun. 2, 2009, which is a division of U.S. patent application Ser. No. 11/671,694, filed Feb. 6, 2007, now U.S. Pat. No. 7,753,154, the entirety of both of which is incorporated herein by reference.

FIELD OF THE INVENTION

The present invention relates to a snowmobile and features thereof which allow for different tunnel widths.

BACKGROUND OF THE INVENTION

In snowmobiles, transverse mass centralization is important in order to have good handling characteristics. If too much mass is placed to one side of the snowmobile, the snowmobile will tend to sink into the snow on that side making it difficult to steer. This is particularly true when the snowmobile is used in soft powdered snow.

Conventionally, snowmobiles have a pair of skis and an endless drive track for propelling the snowmobile, both of which are mounted to a frame of the snowmobile. The frame includes an engine compartment which conventionally has left and right sides, a bottom, a rear (bulkhead), and a front portion. The engine compartment supports power pack components such as an engine, a tuned pipe, a muffler, a reduction gearing, and a continuously variable transmission (CVT). The frame also includes a tunnel rearward of the engine compartment below which the endless drive track is disposed. It is common to have snowmobiles having a tunnel width of 34.3 cm (13.5 inches), 38.1 cm (15 inches), 50.8 cm (20 inches), or 61 cm (24 inches), depending on the intended use of the snowmobile. The CVT has a drive pulley mounted to an output shaft of the engine, a driven pulley, and a belt looped around the two pulleys. The driven pulley is mounted to a countershaft and has a portion thereof which extends next to a side of the tunnel. The countershaft is operatively connected to the endless drive track so as to drive the endless drive track.

Since the engine is the component of the snowmobile which has the largest mass, it is important that the engine be centered as much as possible with respect to the longitudinal centerline of the snowmobile. However, this may not always be possible.

Since a portion of the driven pulley extends next to a side of the tunnel, as mentioned above, for two snowmobiles having different tunnel widths and identical power packs, the snowmobile having the larger tunnel width will need to have the engine more offset to one side of its longitudinal centerline than the other snowmobile, otherwise the driven pulley would interfere with the tunnel. This results in an unbalance in the transverse mass disposition. This unbalance can be counteracted by locating other components of the power pack on the other side of the longitudinal axis of the snowmobile. While this enables designers to design snowmobiles with different tunnel widths, it can be time consuming and costly since many parts of the power pack have to be relocated and/or redesigned each and every time a wider tunnel width is desired. Therefore each tunnel width requires its own power pack configuration. This can sometimes result in having to adopt different assembly procedures to accommodate the different power pack configurations which may increase production time and therefore the overall manufacturing cost of the snowmobiles.

Therefore, there is a need for a family of snowmobiles where the members of the family can be designed with different tunnels, having different tunnel widths, while reducing the changes that have to be made to the power pack configuration as compared with conventional snowmobiles.

SUMMARY OF THE INVENTION

It is an object of the present invention to ameliorate at least some of the inconveniences present in the prior art.

It is also an object of the present invention to provide a family of snowmobiles where the members of the family have engine compartments with the same engine compartment configuration, but have tunnels with different tunnel widths.

In one aspect, the invention provides a family of snowmobiles having a first snowmobile and a second snowmobile. The first snowmobile has a first frame. The first frame includes a first engine compartment having an engine compartment configuration and a first tunnel rearward of the first engine compartment and having a first tunnel width. A first engine is disposed in the first engine compartment. A first countershaft traverses the first engine compartment. A first continuously variable transmission (CVT) operatively connects the first engine with the first countershaft. The first CVT is disposed on a first side of the first engine. A first reduction gearing is operatively connected to the first countershaft on a second side of the first engine opposite the first side. A first endless drive track is disposed below the first tunnel for propelling the first snowmobile. The first endless drive track is operatively connected to the first reduction gearing. A first pair of skis is connected to the first frame. The second snowmobile has a second frame. The second frame includes a second engine compartment having the engine compartment configuration, and a second tunnel rearward of the second engine compartment and having a second tunnel width being greater than the first tunnel width. A second engine is disposed in the second engine compartment. A second countershaft traverses the second engine compartment. A second CVT operatively connects the second engine and the second countershaft. The second CVT is disposed on a first side of the second engine. A second reduction gearing is operatively connected to the second countershaft on a second side of the second engine opposite the first side. A second endless drive track is disposed below the second tunnel for propelling the second snowmobile. The second endless drive track is operatively connected to the second reduction gearing. A second pair of skis is connected to the second frame.

In a further aspect, the first engine has engine physical characteristics and the second engine has the engine physical characteristics. The first countershaft has countershaft physical characteristics and the second countershaft has the countershaft physical characteristics. The first CVT has CVT physical characteristics and the second CVT has the CVT physical characteristics. The first reduction gearing has reduction gearing physical characteristics and the second reduction gearing has the reduction gearing physical characteristics.

In an additional aspect, the first engine, the first countershaft, the first CVT, and the first reduction gearing are disposed in a power pack configuration relative to the first engine compartment. The second engine, the second countershaft, the second CVT, and the second reduction gearing are disposed in the power pack configuration relative to the second engine compartment.

In a further aspect, the first endless drive track has a first track width and the second endless drive track has a second track width which is greater than the first track width.

In an additional aspect, the second snowmobile further includes a first spacer disposed between the second tunnel and a first side of the second engine compartment, and a second spacer disposed between the second tunnel and a second side of the second engine compartment.

In a further aspect, the second tunnel includes a central tunnel portion having a first side and a second side, a first tunnel side portion fastened to the first side of the central tunnel portion, and a second tunnel side portion fastened to the second side of the central tunnel portion.

In an additional aspect, the central tunnel portion comprises a heat exchanger.

In a further aspect, the first spacer is disposed between the first tunnel side portion and the first side of the second engine compartment. The second spacer is disposed between the second tunnel side portion and the second side of the second engine compartment.

In an additional aspect, the first CVT has a driven pulley disposed vertically higher than the first tunnel, and the second CVT has a driven pulley disposed vertically higher than the second tunnel.

In another aspect, the invention provides a snowmobile having a frame which includes an engine compartment, a tunnel rearward of the engine compartment, a first spacer disposed between the tunnel and a first side of the engine compartment, and a second spacer disposed between the tunnel and a second side of the engine compartment.

In another aspect, the invention provides a snowmobile having a frame. The frame includes an engine compartment having a first side and a second side, a tunnel rearward of the engine compartment, a first spacer disposed between the tunnel and the first side of the engine compartment, and a second spacer disposed between the tunnel and the second side of the engine compartment. An engine is disposed in the engine compartment. A countershaft traverses the engine compartment. A continuously variable transmission (CVT) operatively connects the engine with the countershaft. The CVT being disposed on a first side of the engine. An endless drive track is disposed below the tunnel for propelling the snowmobile. The endless drive track is operatively connected to the countershaft. A front suspension is connected to the frame. A pair of skis is connected to the front suspension.

In an additional aspect, the snowmobile also has a reduction gearing operatively connected to the countershaft on a second side of the engine opposite the first side. The endless drive track is operatively connected to the reduction gearing.

In a further aspect, the tunnel includes a central tunnel portion having a first side and a second side, a first tunnel side portion fastened to the first side of the central tunnel portion, and a second tunnel side portion fastened to the second side of the central tunnel portion.

In an additional aspect, the central tunnel portion comprises a heat exchanger.

In a further aspect, the first spacer is disposed between the first tunnel side portion and the first side of the engine compartment, and the second spacer is disposed between the second tunnel side portion and the second side of the engine compartment.

In an additional aspect, the CVT has a driven pulley disposed vertically higher than the tunnel.

In a further aspect, the front suspension includes two pairs of A-arms.

In another aspect, the invention provides a method of manufacturing a snowmobile frame having spacers between the tunnel and the sides of the engine compartment.

In another aspect, the invention provides a method of manufacturing a snowmobile frame. The method comprises providing an engine compartment having a first side and a second side, disposing a tunnel rearwardly of the engine compartment, inserting a first spacer between the tunnel and the first side of the engine compartment, and inserting a second spacer between the tunnel and the second side of the engine compartment.

In an additional aspect, the tunnel comprises a central tunnel portion having a first side and a second side, a first tunnel side portion, and a second tunnel side portion. The method further comprises fastening the first tunnel side portion to the first side of the central tunnel portion, and fastening the second tunnel side portion to the second side of the central tunnel portion.

In a further aspect, the first spacer is inserted between the first tunnel side portion and the first side of the engine compartment, and the second spacer is inserted between the second tunnel side portion and the second side of the engine compartment.

In an additional aspect, the tunnel has a tunnel width and the engine compartment has an engine compartment width. The tunnel width is greater than the engine compartment width.

In another aspect, the invention provides a snowmobile having a countershaft traversing an engine compartment of the snowmobile, where the countershaft is disposed rearwardly of the engine, vertically higher than an air intake opening of the engine, and forwardly of an air intake controller.

In another aspect, the invention provides a snowmobile having a frame. The frame includes an engine compartment and a tunnel rearward of the engine compartment. An engine is disposed in the engine compartment. The engine has at least one air intake opening on a rear side thereof. An air intake controller is disposed rearwardly of the engine and fluidly communicates with the air intake opening. A countershaft traverses the engine compartment. The countershaft is disposed rearwardly of the engine, vertically higher than the air intake opening, and forwardly of the air intake controller. A continuously variable transmission (CVT) operatively connects the engine with the countershaft. An endless drive track is disposed below the tunnel for propelling the snowmobile. The first endless drive track is operatively connected to the countershaft. A front suspension is connected to the frame. A pair of skis is connected to the front suspension.

In an additional aspect, the air intake controller is one of a carburetor and a throttle body.

In a further aspect, the CVT is disposed on a first side of the engine. The snowmobile also has a reduction gearing operatively connected to the countershaft on a second side of the engine opposite the first side.

In an additional aspect, the engine has an output shaft. The snowmobile also has a drive axle disposed in the tunnel. The drive axle is operatively connected to the countershaft for driving the endless drive track.

In a further aspect, the countershaft is disposed rearwardly of the output shaft and forwardly of the drive axle.

In an additional aspect, the countershaft defines a countershaft axis. The countershaft axis is generally vertically aligned with a top portion of the engine.

In another aspect, the invention provides a family of snowmobiles where frames of the members of the family have engine compartments with the same engine compartment configuration, but have tunnels with different tunnel widths, and where the distance from a side of the engine to a longitudinal centerline of the frame for each member of the family is the same.

In another aspect, the invention provides a family of snowmobiles having a first snowmobile and a second snowmobile. The first snowmobile has a first frame. The first frame includes a first longitudinal centerline, a first engine compartment having a first engine compartment configuration, and a first tunnel rearward of the first engine compartment. The first tunnel has a first tunnel width. A first engine is disposed in the first engine compartment. The first engine has engine characteristics, a first side and a second side opposite the first side. The first side is disposed a first distance from the first longitudinal centerline. A first countershaft traverses the first engine compartment. A first continuously variable transmission (CVT) operatively connects the first engine with the first countershaft. The first CVT is disposed on the first side of the first engine. A first reduction gearing is operatively connected to the first countershaft on the second side of the first engine. A first endless drive track is disposed below the first tunnel for propelling the first snowmobile. The first endless drive track is operatively connected to the first reduction gearing. A first pair of skis is connected to the first frame. The second snowmobile has a second frame. The second frame includes a second longitudinal centerline, a second engine compartment having a second engine compartment configuration, and a second tunnel rearward of the second engine compartment. The second tunnel has a second tunnel width being greater than the first tunnel width. A second engine is disposed in the second engine compartment. The second engine has the engine characteristics, a first side and a second side opposite the first side. The first side is disposed a second distance from the second longitudinal centerline. The second distance is the same as the first distance. A second countershaft traverses the second engine compartment. A second CVT operatively connects the second engine and the second countershaft. The second CVT is disposed on the first side of the second engine. A second reduction gearing is operatively connected to the second countershaft on the second side of the second engine. A second endless drive track is disposed below the second tunnel for propelling the second snowmobile. The second endless drive track is operatively connected to the second reduction gearing. A second pair of skis is connected to the second frame.

In a further aspect, the first endless drive track has a first track width, and the second endless drive track has a second track width being greater than the first track width.

In an additional aspect, the second snowmobile also has a first spacer disposed between the second tunnel and a first side of the second engine compartment, and a second spacer disposed between the second tunnel and a second side of the second engine compartment.

In a further aspect, the first CVT has a driven pulley disposed vertically higher than the first tunnel, and the second CVT has a driven pulley disposed vertically higher than the second tunnel.

In another aspect, the invention provides a method of manufacturing a snowmobile frame and power pack by providing an engine compartment, selecting a tunnel from a group of tunnels each having a different width, disposing the selected tunnel rearwardly of the engine compartment, and disposing the power pack in the engine compartment.

In another aspect, the invention provides a method of manufacturing a snowmobile frame and power pack. The power pack includes an engine, a CVT on a first side of the engine, the CVT having a driven pulley, a reduction gearing on a second side of the engine opposite the first side, and a countershaft operatively connecting the driven pulley with the reduction gearing. The method comprises providing an engine compartment having a engine compartment configuration adapted to receive the power pack, selecting one of a first tunnel and a second tunnel, the first tunnel having a first tunnel width, the second tunnel having a second tunnel width, the second tunnel width being different from the first tunnel width, disposing the selected one of the first tunnel and the second tunnel rearwardly of the engine compartment, and disposing the power pack in the engine compartment, wherein the driven pulley is disposed vertically above the selected one of the first tunnel and the second tunnel.

In an additional aspect, disposing the power pack in the engine compartment includes locating the driven pulley at a first distance from a longitudinal centerline of the frame when the first tunnel is selected, and locating the driven pulley at a second distance from the longitudinal centerline of the frame when the second tunnel is selected. The first distance is the same as the second distance.

In a further aspect, the method further comprises inserting a first spacer between the selected one of the first tunnel and the second tunnel and a first side of the engine compartment, and inserting a second spacer between the selected one of the first tunnel and the second tunnel and a second side of the engine compartment.

For purposes of this application, the term "configuration" means the relative arrangement of components. For example, the power pack configuration refers to the arrangement of the engine, CVT, reduction gearing, and other power pack components relative to each other. The terms "physical characteristics" mean the features of a component. For example, the engine physical characteristics of an engine could include, but are not limited to, the number of cylinders, the type of cycle it operates on (two-cycle or four cycle), the engine's dimensions, and the engine's horsepower. The terms "power pack" mean the combination of an engine and components for transmitting power from the engine. These components could include, but are not limited to, one or more of a CVT, a reduction gearing, and a shaft. The term "tunnel" means the rear portion of the frame of a snowmobile that has a generally inverted U-shaped transverse cross-section. The tunnel houses at least a portion of the endless drive track of the snowmobile therein and the seat of the snowmobile is at least partially disposed on the tunnel.

Embodiments of the present invention each have at least one of the above-mentioned aspects, but do not necessarily have all of them. It should be understood that some aspects of the present invention that have resulted from attaining the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

Aspects of the present invention relate to a family of snowmobiles. However, since each member of the family of snowmobiles has common features only one snowmobile 10 will be described herein in detail for simplicity. Even though only one snowmobile 10 is described, it should be understood that features of members of the snowmobile family that are not directly related to the invention, such as the skis or seat for example, may be different from one member to the other without deviating from the invention.

Figure 10:
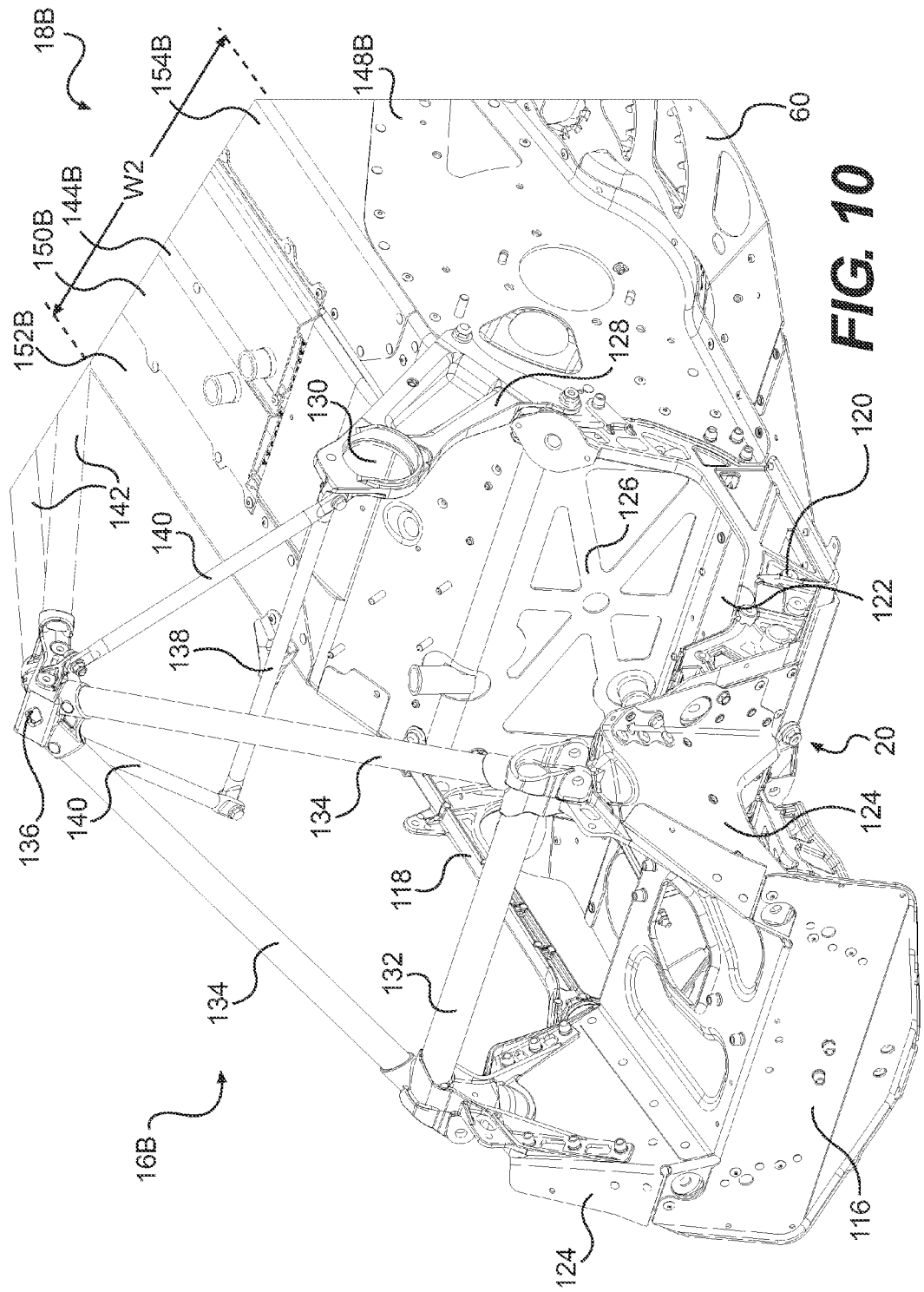
FIG. 10 is a perspective view, taken from a front, left side, of a forward portion of a second frame in accordance with aspects of the invention.
Figure 11:
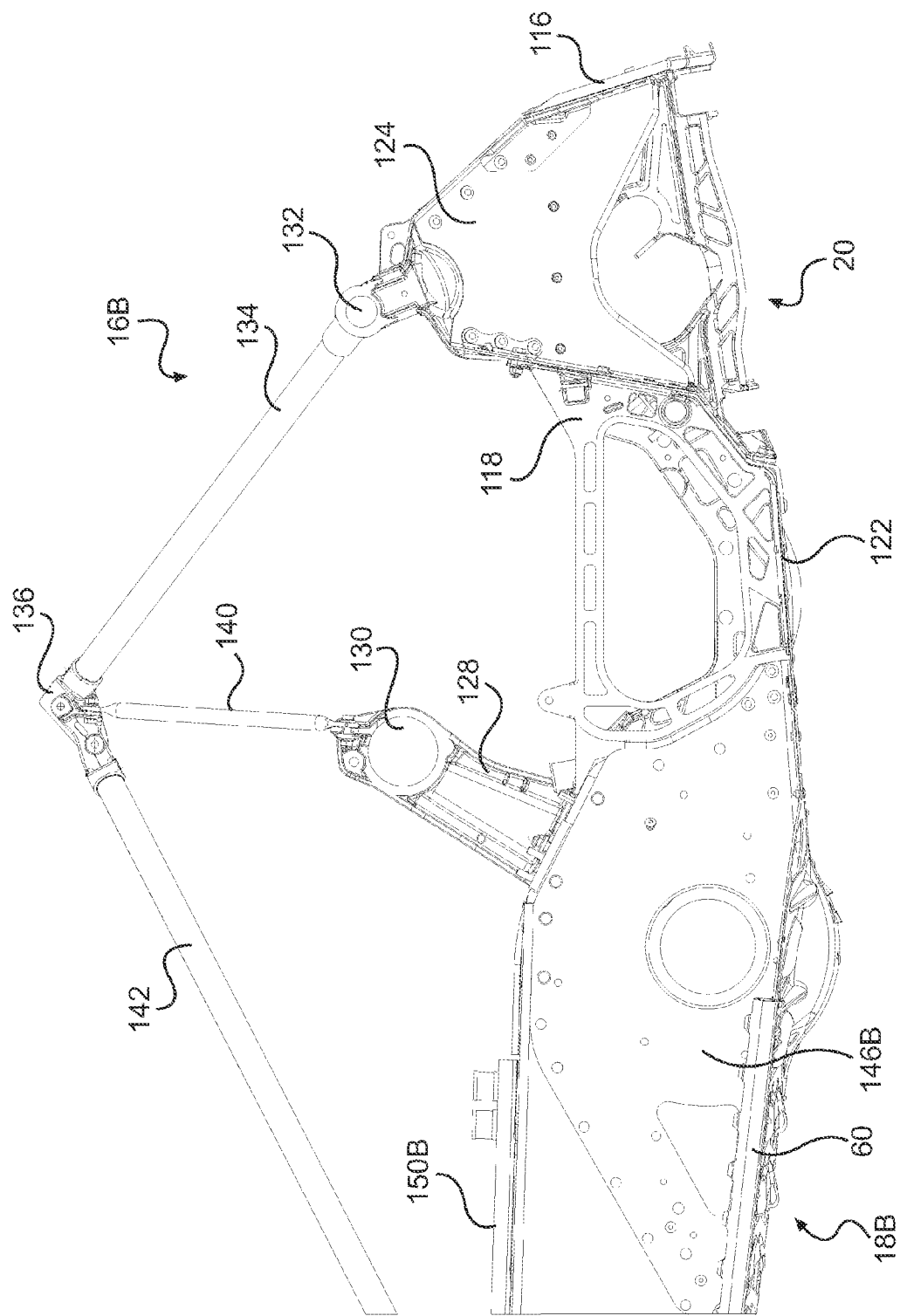
FIG. 11 is a right side elevation view of the forward portion of the second frame of FIG. 10.
Figure 12:
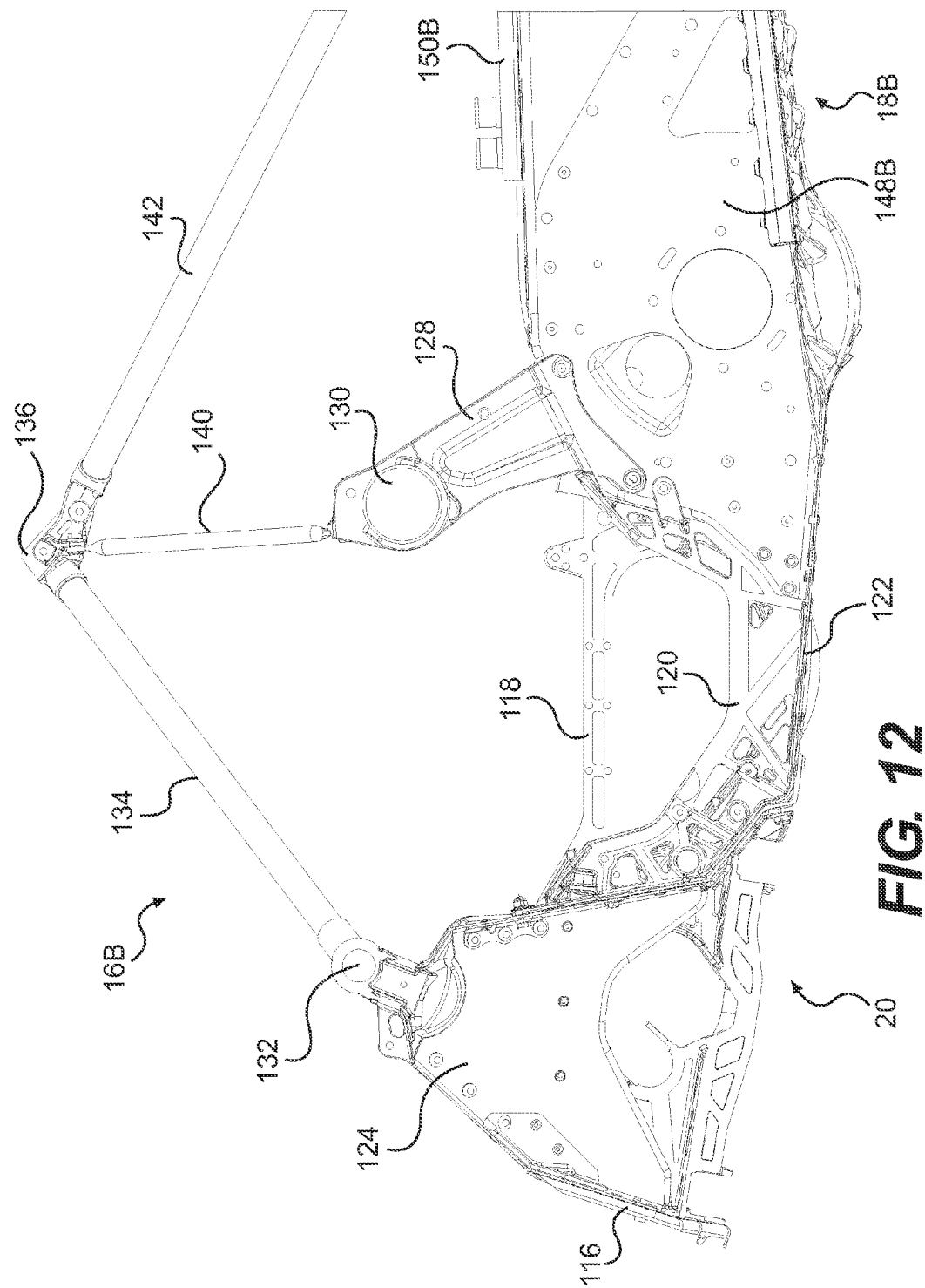
FIG. 12 is a left side elevation view of the forward portion of the second frame of FIG. 10.

As will become apparent from the following description, the members of the family each have a different frame 16A (FIGS. 2 to 9), 16B (FIG. 10 to 12), or 16C (FIGS. 13 to 19) but other features, such as a power pack 102, can remain generally the same. As will also become apparent from the following description, the different frames 16A, 16B, and 16C each have a corresponding tunnel 18A, 18B, and 18C, each of which has a different tunnel width to accommodate different widths of endless track 65, but each have an engine compartment 20 which has generally the same engine compartment configuration as the others. It should be understood that throughout this application the term "same" does not require the components referred to as such to be exactly identical and that minor variations between these elements are contemplated. By way of non-limiting example, the frames 16A, 16B, and 16C could have different bracket physical characteristics to accommodate different optional components of the particular snowmobile 10. For simplicity, components which are different in each embodiment will be referred to by their reference numeral and corresponding letter when referring to a specific one of the components (e.g. tunnel 18A) but will only be referred to by their reference numeral when the description could apply to any one of the embodiments (i.e. tunnel 18 will be used when referring to any one of tunnels 18A, 18B, and 18C).

Figure 1:
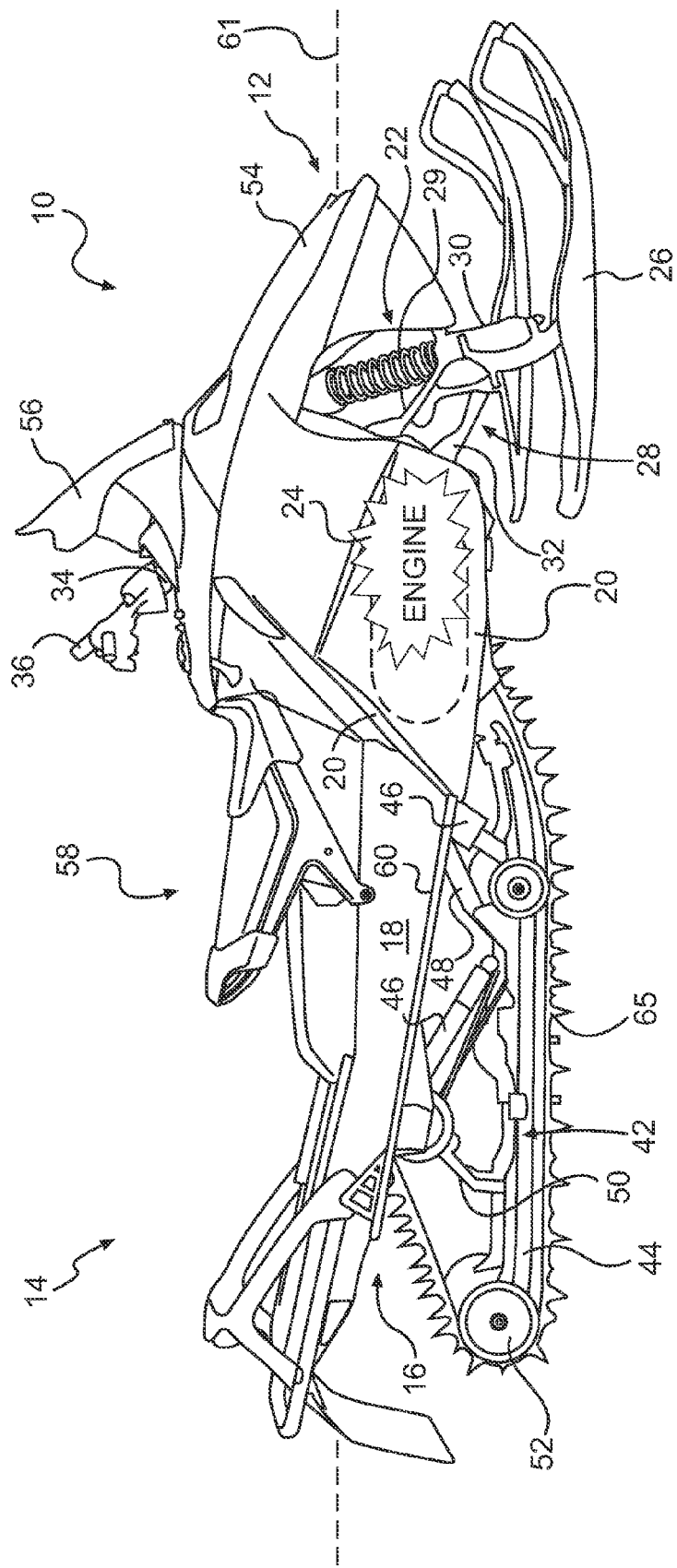
FIG. 1 is a right side elevation view of a snowmobile in accordance with the invention.
Figure 2:
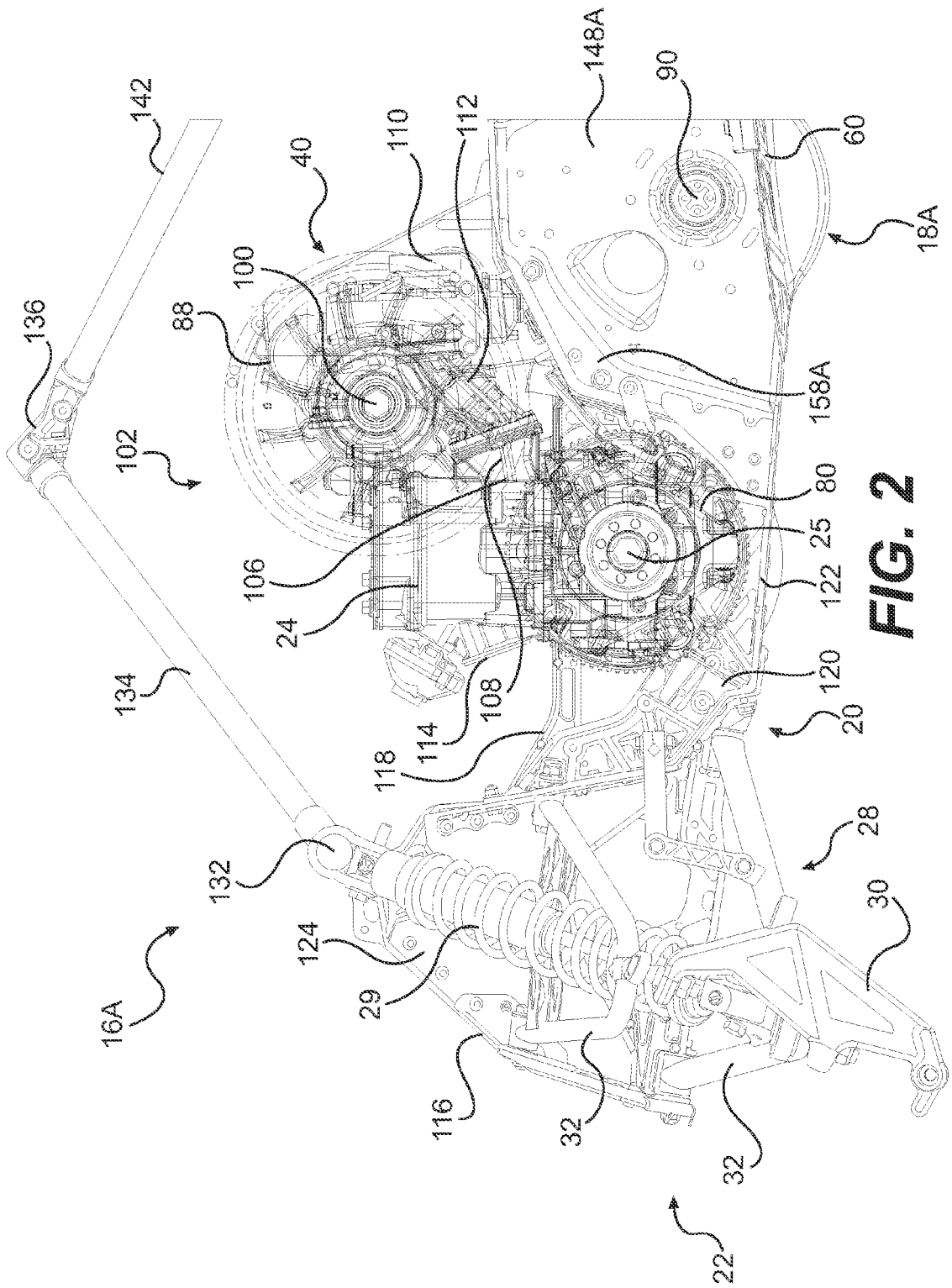
FIG. 2 is a left side elevation view of a forward portion of a first frame and power pack in accordance with aspects of the invention, with portions of the first frame removed for clarity.
Figure 3:
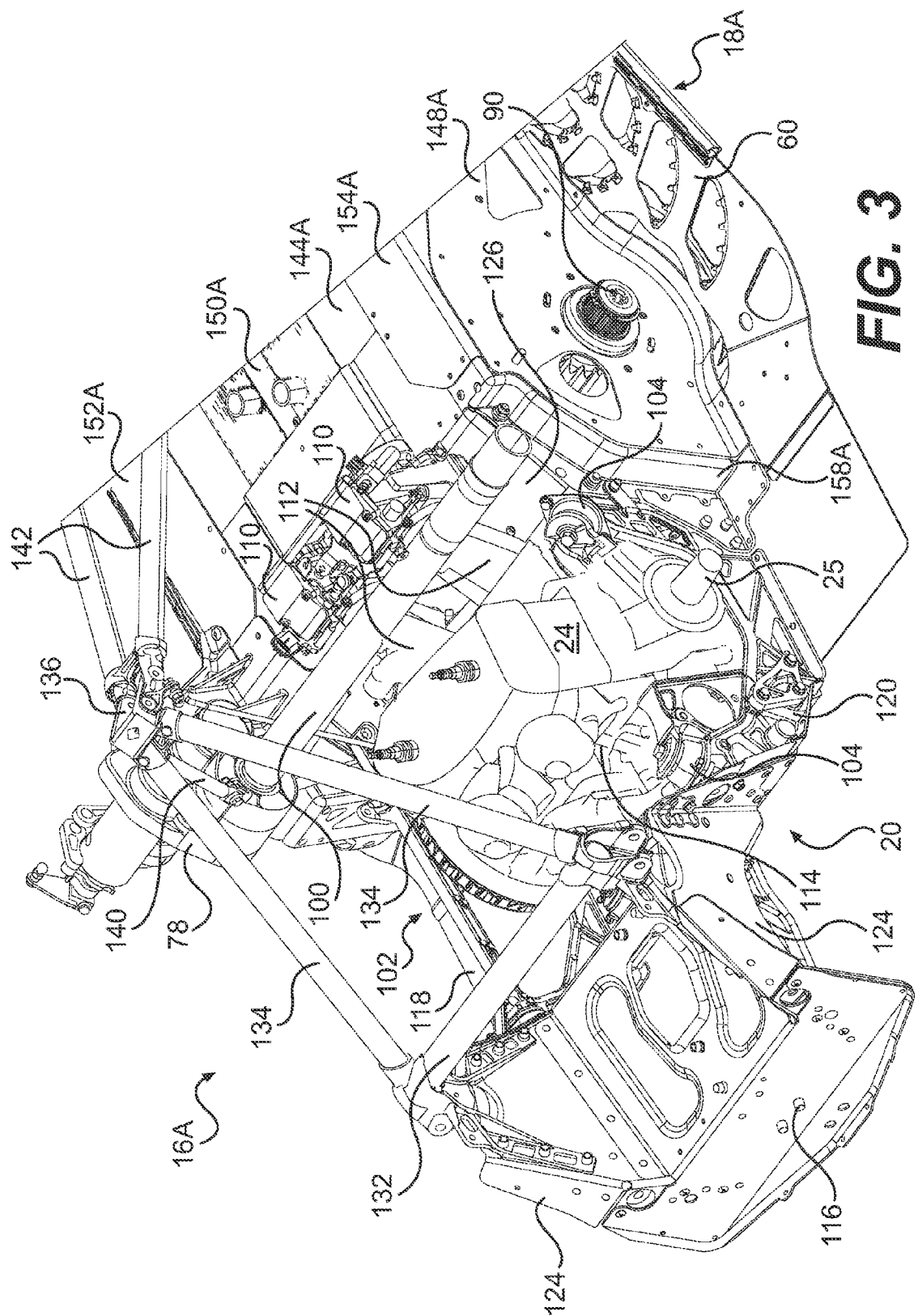
FIG. 3 is a perspective view, taken from a front, left side, of the forward portion of the first frame and power pack of FIG. 2, with portions of the first frame and the CVT removed for clarity.
Figure 6:
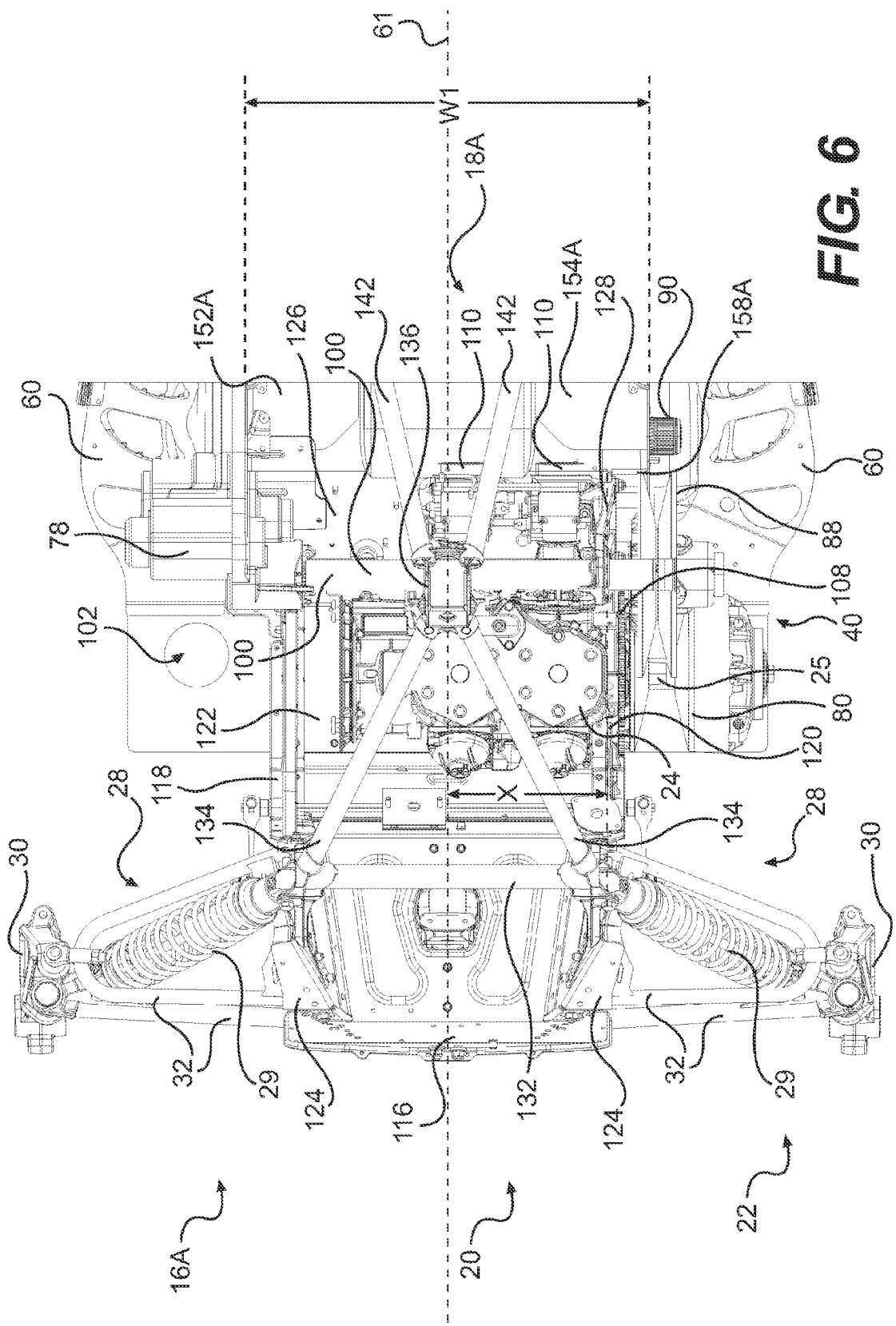
FIG. 6 is a top view of the forward portion of the first frame, power pack, and front suspension of FIG. 2, with portions of the first frame removed for clarity.

As seen in FIG. 1, the snowmobile 10, the description of which can correspond to any member of the family of snowmobiles, includes a forward end 12 and a rearward end 14 which are defined consistently with a travel direction of the snowmobile 10. The snowmobile 10 includes a frame 16 (16A, 16B, or 16C) which includes a tunnel 18 (18A, 18B, or 18C) and an engine compartment 20 as described in greater detail below. A front suspension 22 is connected to the frame. The tunnel 18 generally consists of one or more pieces of sheet metal bent to form an inverted U-shape. The tunnel 18 extends rearwardly along the longitudinal centerline 61 of the snowmobile 10 and is connected at the front to the engine compartment 20. An engine 24, which is schematically illustrated in FIG. 1, is carried by the engine compartment 20 of the frame 16. A steering assembly (not indicated) is provided, in which two skis 26 are positioned at the forward end 12 of the snowmobile 10 and are attached to the front suspension 22 through a pair of front suspension assemblies 28. As best seen in FIGS. 2 and 6, each front suspension assembly 28 includes a ski leg 30, a pair of A-arms 32 and a shock absorber 29 for operatively connecting the respective skis 26 to a steering column 34. Other types of front suspension assemblies 28 are contemplated, such as a swing-arm or a telescopic suspension. A steering device such as a handlebar 36, positioned forward of a rider, is attached to the upper end of the steering column 34 to allow the rider to rotate the ski legs 30 and thus the skis 26, in order to steer the snowmobile 10.

An endless drive track 65 is positioned at the rear end 14 of the snowmobile 10. The endless drive track 65 is disposed generally under the tunnel 18, and is operatively connected to the engine 24 as will be described in greater detail below. The endless drive track 65 is driven to run about a rear suspension assembly 42 for propelling the snowmobile 10. The rear suspension assembly 42 includes a pair of slide rails 44 in sliding contact with the endless drive track 65. The rear suspension assembly 42 also includes one or more shock absorbers 46 which may further include a coil spring (not shown) surrounding the individual shock absorbers 46. Suspension arms 48 and 50 are provided to attach the slide rails 44 to the frame 16. One or more idler wheels 52 are also provided in the rear suspension assembly 42.

At the front end 12 of the snowmobile 10, fairings 54 enclose the engine 24, thereby providing an external shell that not only protects the engine 24, but can also be decorated to make the snowmobile 10 more aesthetically pleasing. Typically, the fairings 54 include a hood (not indicated) and one or more side panels which can be opened to allow access to the engine 24 when this is required, for example, for inspection or maintenance of the engine 24. In the particular snowmobile 10 shown in FIG. 1, the side panels can be opened along a vertical axis to swing away from the snowmobile 10. A windshield 56 may be connected to the fairings 54 near the front end 12 of the snowmobile 10 or directly to the handlebar 36.

The windshield 56 acts as a wind screen to lessen the force of the air on the rider while the snowmobile 10 is moving.

A straddle-type seat 58 is positioned atop the frame 16. A rear portion of the seat 58 may include a storage compartment or can be used to accommodate a passenger seat (not indicated). Two footrests 60 are positioned on opposite sides of the snowmobile 10 below the seat 58 to accommodate the driver's feet.

Turning now to FIGS. 2 to 6, a power pack 102 for powering the endless drive track 65 will be described. For reasons described below, the power pack 102 has a power pack configuration which permits it to be disposed in any one of frames 16A, 16B and 16C without having to be modified. The power pack 102 includes, but is not limited to, the engine 24, a variable ratio belt transmission system, also known as a continuously variable transmission or CVT 40, a reduction gearing 78, and a countershaft 100.

Figure 4:
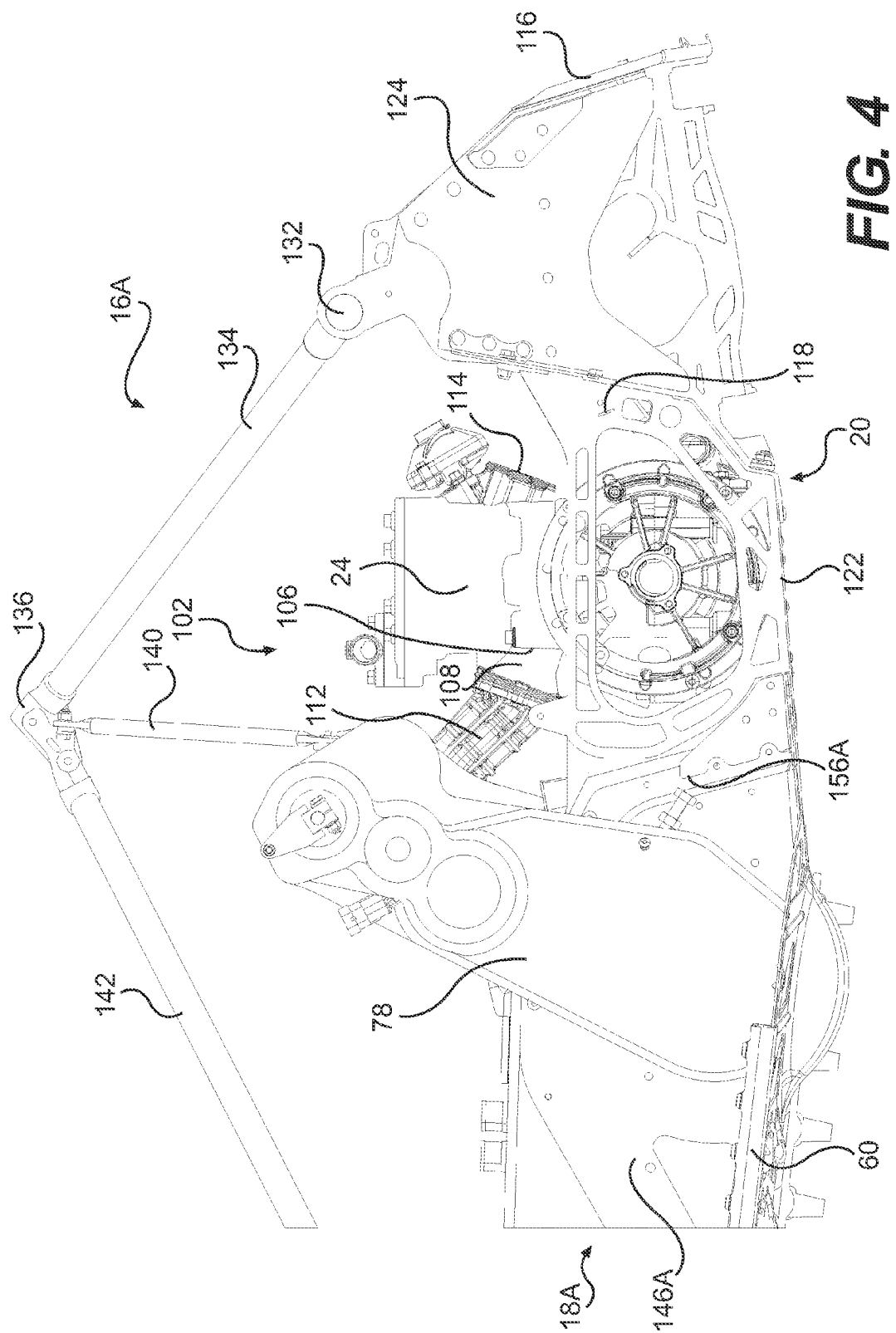
FIG. 4 is a right side elevation view of the forward portion of the first frame and power pack of FIG. 2, with the CVT removed for clarity.
Figure 5:
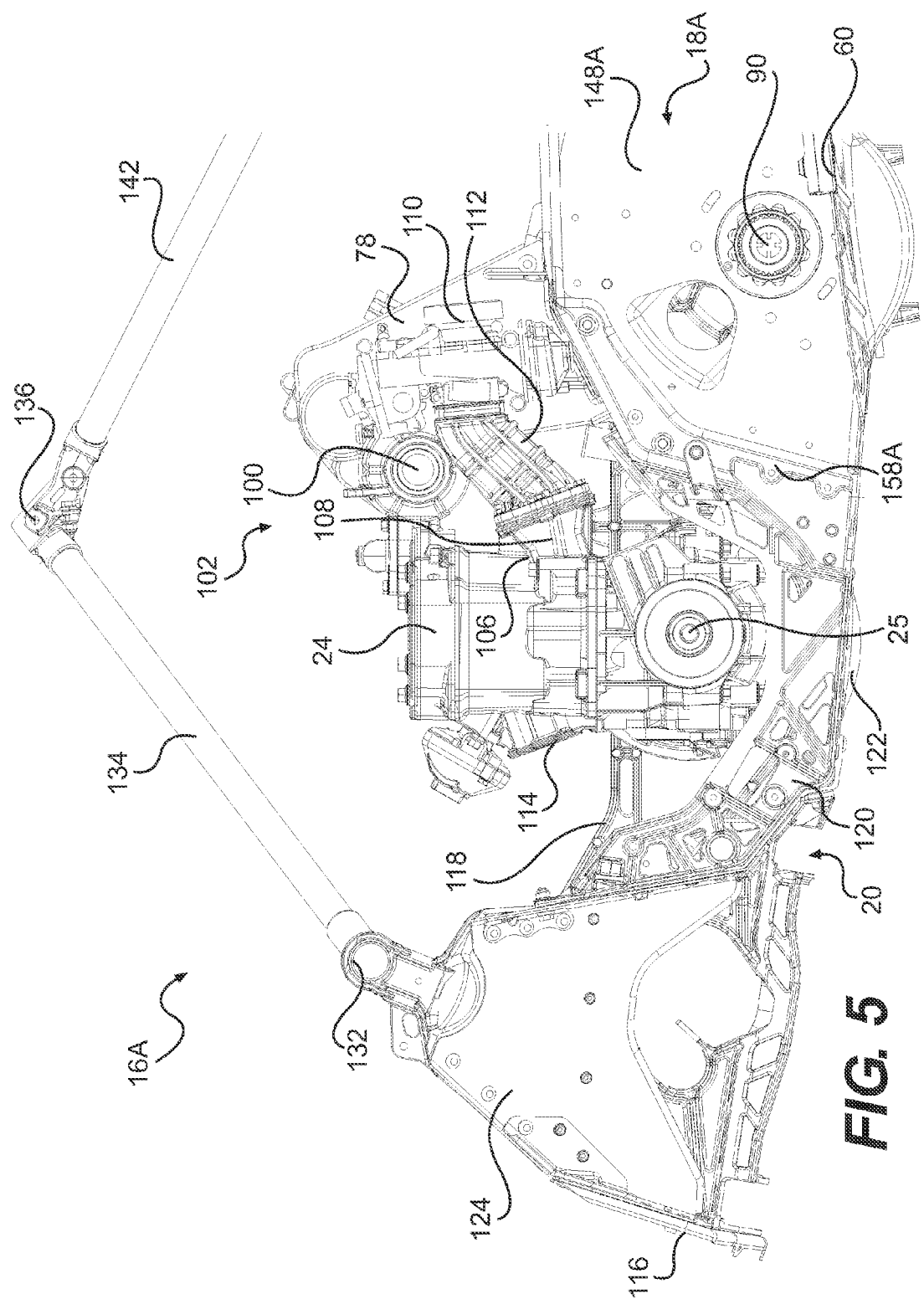
FIG. 5 is a left side elevation view of the forward portion of the first frame and power pack of FIG. 2, with portions of the first frame and the CVT removed for clarity.

The engine 24 is a two cylinder, two-cycle internal combustion engine. It is contemplated that the engine 24 could be of any other type, such as a four-cycle internal combustion engine. The engine 24 is disposed in the engine compartment 20 and rests on vibration dampers 104 (FIG. 3) to reduce the transmission of vibrations from the engine 24 to the frame 16. As best seen in FIGS. 4 and 5, the engine 24 has a plurality of air intakes 106 (one per cylinder) on a rear side thereof. An air intake manifold 108 is connected to the rear side of the engine 24 so as to fluidly communicate with the air intakes 106. Two air intake controllers 110, disposed vertically higher and rearwardly from the air intake manifold 108, fluidly communicate with the air intake manifold 108 via air intake passages 112. Although two air intake controllers 110 are illustrated, it is contemplated that only one air intake controller 110 could be used. The air intake controllers 110 each comprise a valve (not shown) which controls the flow of air to the engine 24. It is contemplated that the air control devices could be in the form of a carburetor or a throttle body. A plurality of exhaust ports 114 (one per cylinder) are disposed on a front side of the engine 24. An exhaust system (not shown) fluidly communicates with the engine 24 to exhaust the gases from the combustion process. The engine 24 comprises a crankshaft (not shown) which drives an output shaft 25. The crankshaft and output shaft 25 are coaxial and rotate about a horizontally disposed axis that extends generally transversely to the longitudinal centerline 61 of the snowmobile 10. It is contemplated that the crankshaft and output shaft 25 could be offset from one another. It is also contemplated that the crankshaft and the output shaft 25 could be integrally formed as a single shaft. As would be known by those skilled in the art, the engine 24 includes other systems, such as the fuel and electrical systems, but these have not been illustrated or described herein for simplicity.

Figure 13:
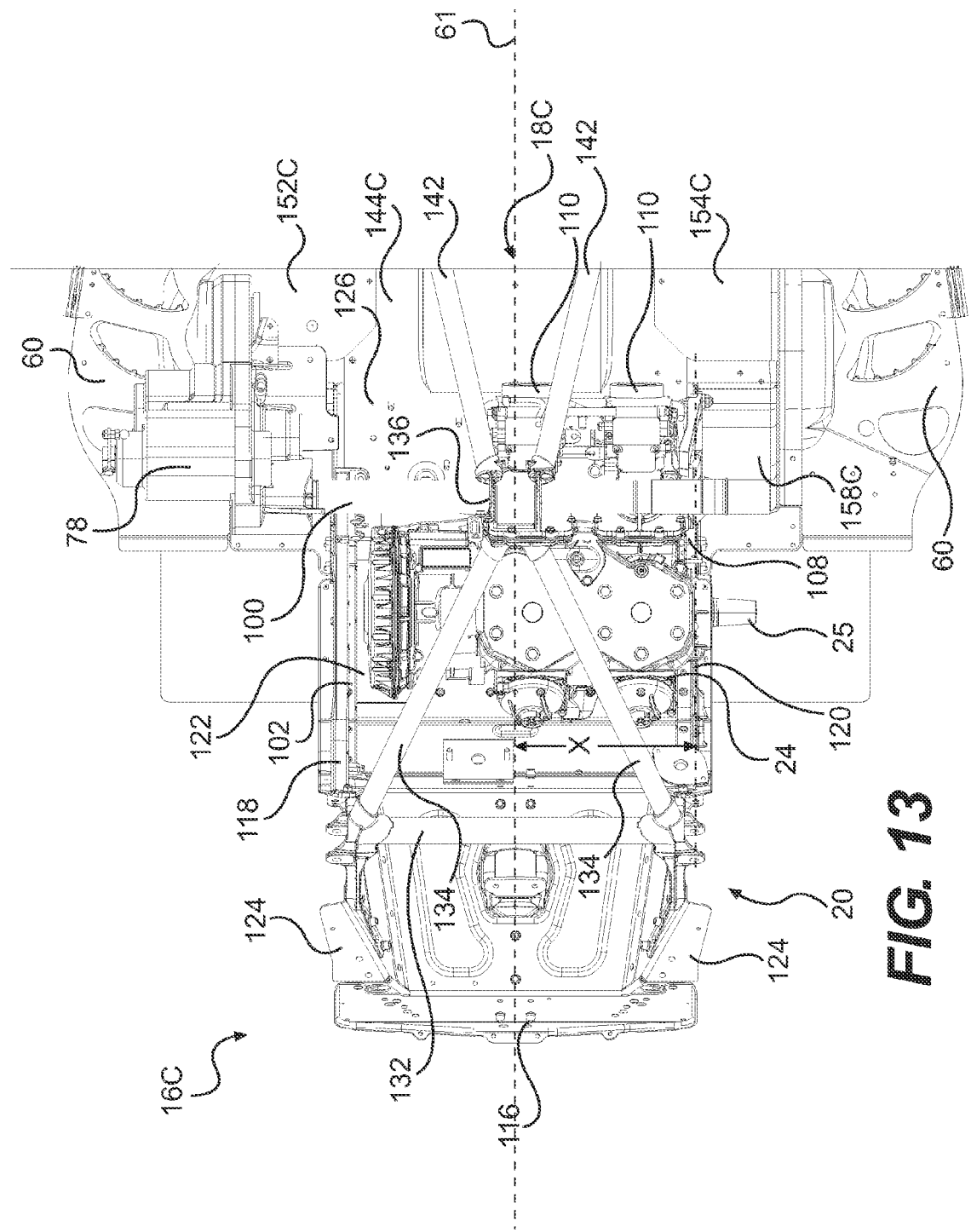
FIG. 13 is a top view of a forward portion of a third frame and power pack of in accordance with aspects of the present invention, with portions of the third frame and the CVT removed for clarity.
Figure 14:
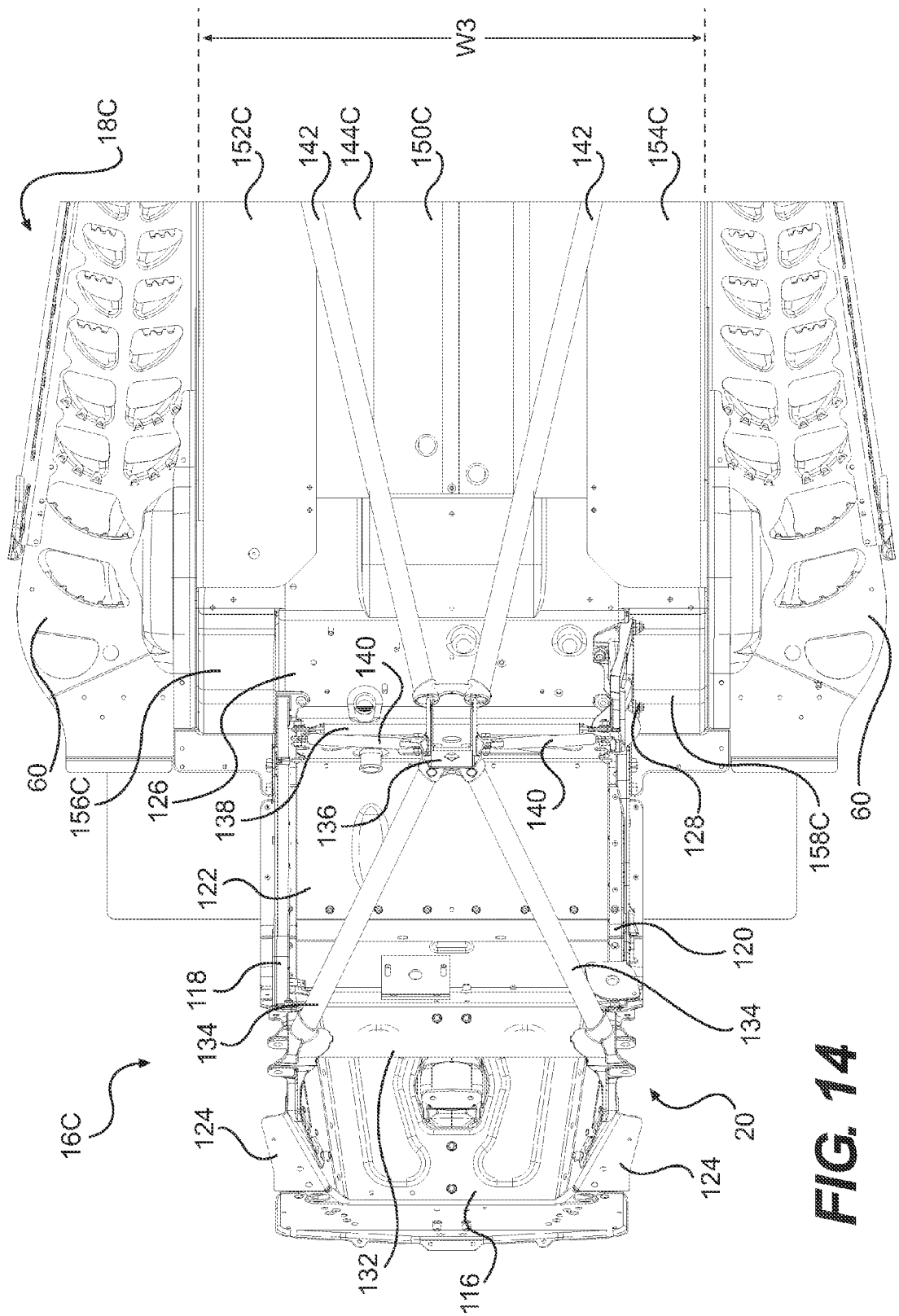
FIG. 14 is a top view of the forward portion of the third frame of FIG. 13.
Figure 15:
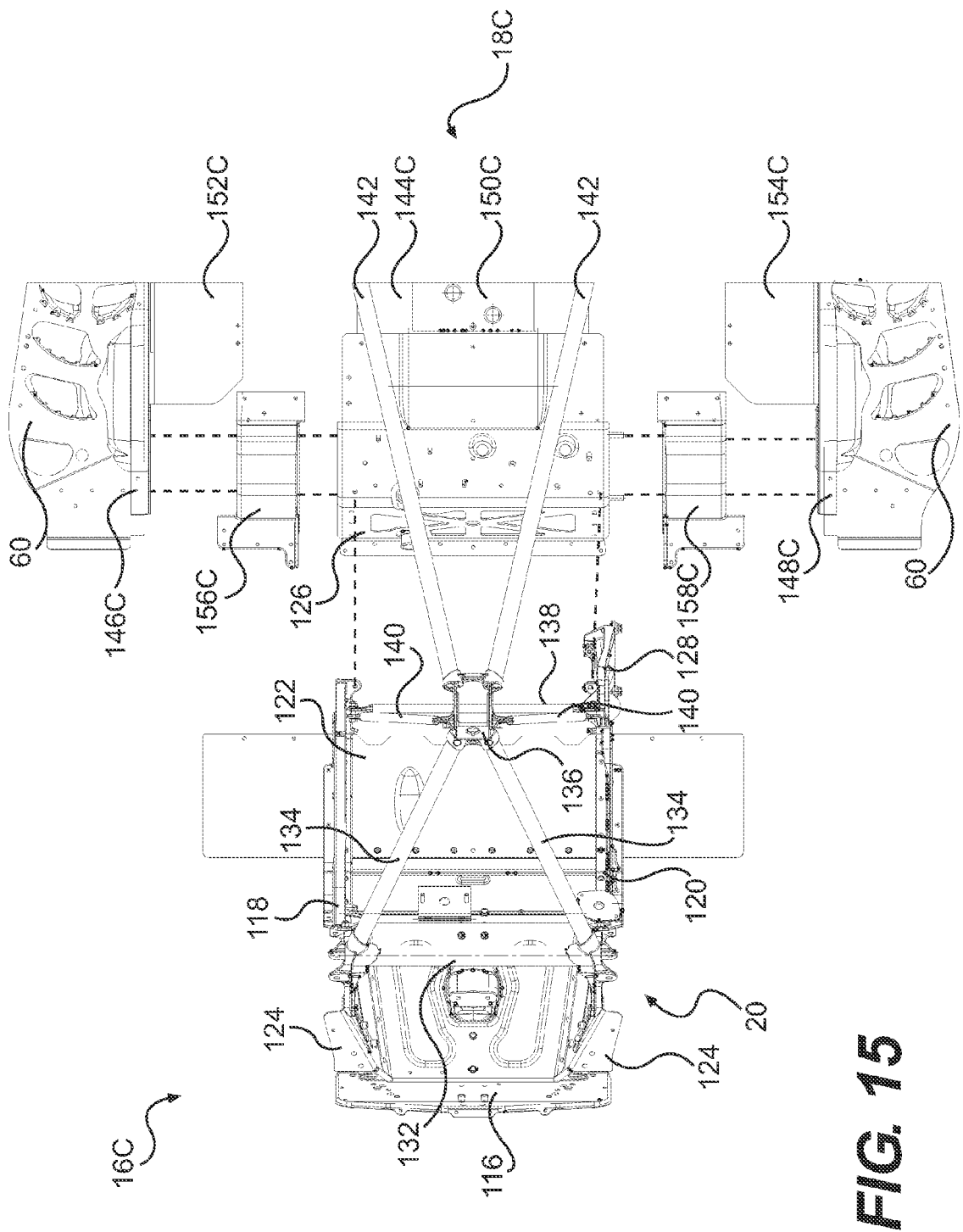
FIG. 15 is an exploded top view of the forward portion of the third frame of FIG. 13.
Figure 16:
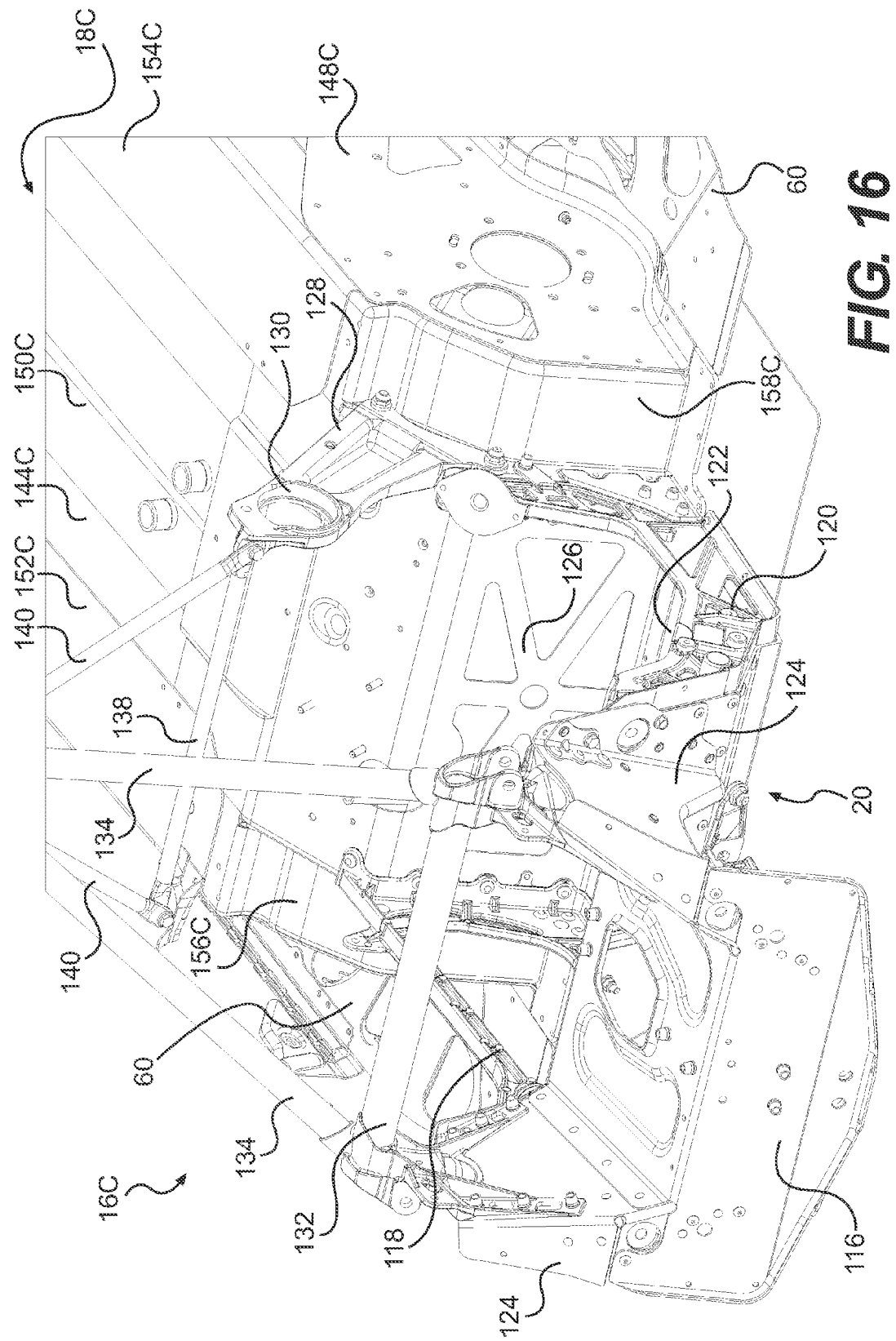
FIG. 16 is a perspective view, taken from a front, left side, of the forward portion of the third frame of FIG. 13.
Figure 17:
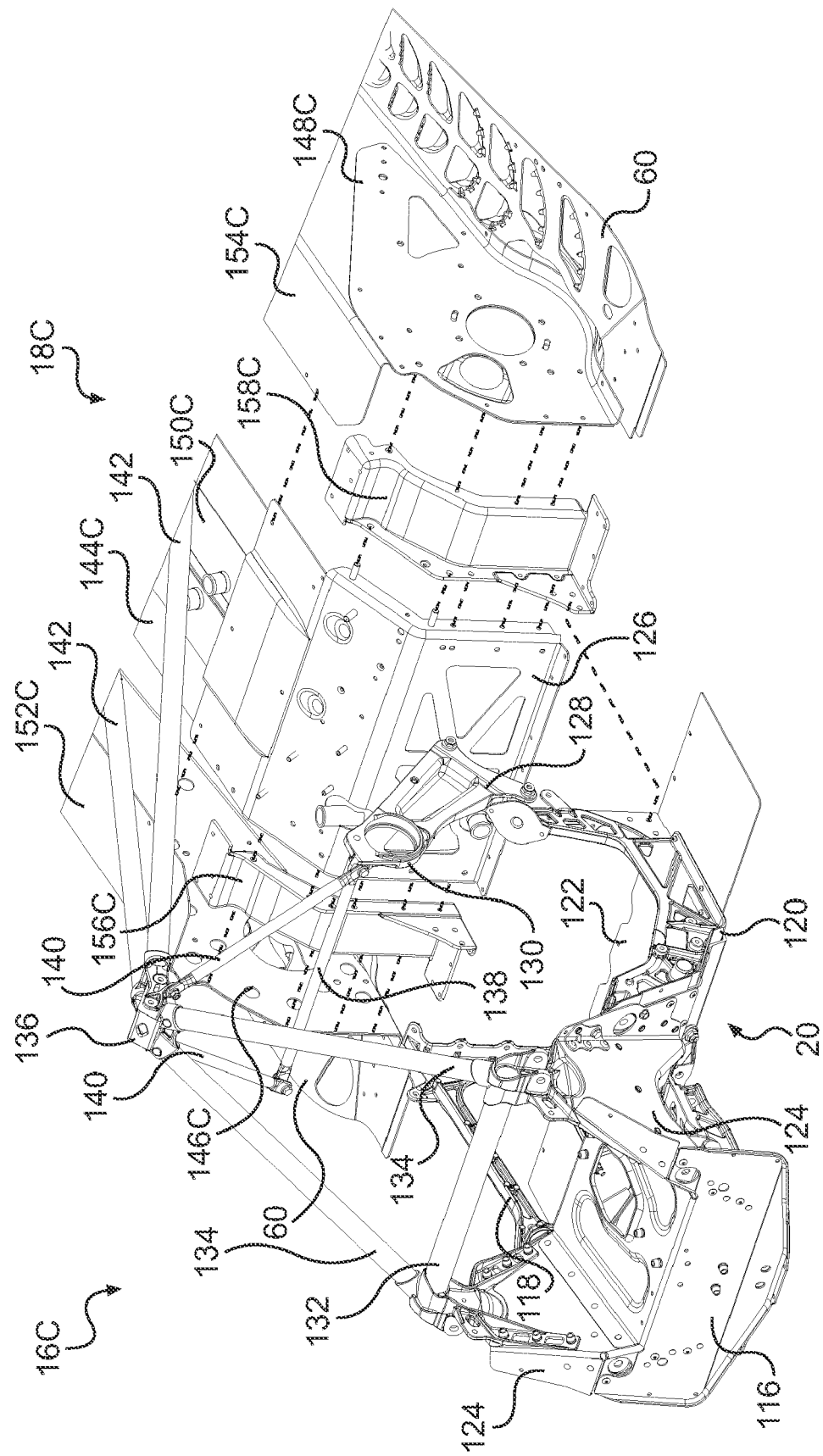
FIG. 17 is an exploded perspective view, taken from a front, left side, of the forward portion of the third frame of FIG. 13.

Turning now to FIGS. 2 to 6 and 13, the power pack configuration of the power pack 102 will be described. As can be seen in FIGS. 2 and 6, the CVT 40 is disposed on a first side of the engine 24 and includes a driving pulley 80 coupled to rotate with the output shaft 25 of the engine 24 and a driven pulley 88 coupled to one end of a transversely mounted countershaft 100. The countershaft 100 is supported in the engine compartment 20 through bearings. As can be seen, the countershaft 100 traverses the width of the engine compartment 20. As best seen in FIG. 5, the countershaft is disposed rearwardly of the engine 24, vertically higher than the air intake openings 106, and forwardly of the air intake controllers 110. The countershaft 100 is also disposed vertically higher than the tunnel 18 and a central axis of the countershaft 100 (the countershaft axis) is generally vertically aligned with a top portion of the engine 24. In this position of the countershaft 100, the driven pulley 88 is in proximity to the driving pulley 80 which ensures a good torque transfer from the driving pulley 80 to the driven pulley 88. Also, by locating the countershaft 100 in this position and by appropriately sizing the driven pulley 88, the lowermost portion of the driven pulley 88 is disposed vertically higher than the tunnel 18 such that regardless of in which frame 16A, 16B, or 16C the power pack 102 is disposed, the driven pulley 88 will not interfere with the corresponding tunnel 18A, 18B, or 18C. Therefore, the power pack 102 can be used in any one of frames 16A, 16B, and 16C without having to modify the power pack configuration and without having to move the engine laterally with respect to the longitudinal centerline 61, thus maintaining the transverse mass centralization of the snowmobile 10. As can be seen in FIGS. 6 and 13, a distance X between the centerline 61 and an end of the engine 24 in frames 16A and 16B remains the same, and would be the same in frame 16C. Also since the power pack 102 can remain the same regardless of which frame 16A, 16B, or 16C is used, the frames 16A, 16B, and 16C can have engine compartments 20 that have the same configuration.

The driving pulley 80 of the CVT 40 is coupled to rotate with the output shaft 25 of the engine 24 and includes a pair of opposed frustoconical belt drive sheaves (one fixed sheave and one moving sheave) between which the drive belt (not shown) is located. The sheaves are biased apart, and the driving pulley 80 incorporates a centrifugally operated mechanism that acts to urge the moving sheave towards the fixed sheave with a force that increases with increasing output shaft speed so that as the engine speed increases, the reduction ratio of the CVT 40 decreases. The driven pulley 88 is coupled to rotate with the countershaft 100 and includes a pair of frustoconical belt drive sheaves between which the drive belt is located. The driven pulley 88 reacts to the torque from the endless drive track 65 by separation of its sheaves which allows the drive belt to engage the driven pulley 88 at a diameter that is progressively reduced as the torque increases or that is progressively increased as the torque decreases. When the driving pulley 80 increases its diameter, the driven pulley 88 decreases its effective diameter and vice versa, thus keeping the drive belt in tension.

A reduction gearing 78 is disposed on a second side of the engine 24 which is opposite the side on which the CVT 40 is disposed. The end of the countershaft 100 which is opposite the end on which the driven pulley 88 is disposed is connected to an input member of the reduction gearing 78. The input member of the reduction gearing 78 consists of a small sprocket connected to the countershaft 100. An output member of the reduction gearing 78 is connected to a front drive axle 90. The output member consists of sprocket which is larger than the sprocket of the input member and is connected to the drive axle 90. The output member is driven via a chain by the input member. It is also contemplated that the output member could be driven via gears by the input member. The input member, the output member, and the chain are enclosed within the housing of the reduction gearing 78. The front drive axle 90 is disposed in the tunnel 18 and carries sprocket wheels (not shown)) that form a driving connection with the endless drive track 65. The output shaft 25, the countershaft 100, and the front drive axle 90 are arranged such that the countershaft 100 is disposed rearwardly of the output shaft 25 and forwardly of the front drive axle 90.

In this particular example, the driving pulley 80 rotates at the same speed as the output shaft 25 of the engine 24. The speed of rotation of the countershaft 100 is determined in accordance with the instantaneous ratio of the CVT 40. The drive axle 90 rotates at a lower speed than the countershaft 100 since the reduction gearing 78 has a reduction ratio.

As previously mentioned, since the power pack 102 has a power pack configuration in which the driven pulley 88 of the CVT 40 does not interfere with the tunnel 18, different members of the family of snowmobiles 10 can be designed with different tunnel widths without having to move the power pack 102 transversely as was the case in the prior art. Since the power pack 102 does not have to be moved from one member of the family to the other, then the same configuration of engine compartment can be used by all members of the family. This advantageously reduces the manufacturing cost as would be understood by those skilled in the art. The configuration of engine compartment 20 will now be described with respect to FIGS. 2 to 6 and more particularly FIGS. 10 to 12, but the same engine compartment 20 also appears in the other figures. It should be noted that portions of the engine compartment have been removed from FIGS. 2 to 6 such that portions of the power pack 102 can be seen more clearly. It should be understood that the configuration of the engine compartment 20 described herein is only one possible configuration and that other configurations for engine compartment 20 are contemplated, but that regardless of the configuration selected, since the power pack 102 does not have to be moved transversely as the tunnel 18 is widened, a particular configuration could be used by all members of the family of snowmobile.

The lower portion of the engine compartment 20 has a front sub-frame 116 behind which are connected a right side wall 118, a left side wall 120, and an engine compartment bottom 122. The side walls 118, 120 are generally vertical and generally parallel to the longitudinal centerline 61. The engine compartment bottom 122 is generally horizontal and extends transversely between and beyond the side walls 118, 120. The length by which the engine compartment bottom 122 extends beyond the side walls 118, 120 is determined by features of the snowmobile 10 that need to be attached to engine compartment 20. Although the engine compartment bottom 122 is shown as being different from one frame 16 to the other, it could actually be the same in all of the frames 16, therefore this change is considered to be one of the minor variations contemplated and as such the engine compartments 20 are still considered to have the same configuration (see the definition of "same" above). The front sub-frame 116 has a pair of inverted generally V-shaped suspension mounting brackets 124, one on each side thereof, to receive the pair of front suspension assemblies 28 as seen in FIGS. 2 and 6. It is contemplated that the suspension mounting brackets 124 could be modified to accommodate a different type of front suspension assemblies 28 from one member of the family of snowmobiles to the other. A bulkhead 126 has one side connected to a rear portion of right side wall 118, the other side connected to a rear portion of the left side wall 120, and a bottom connected to a rear portion of the engine compartment bottom 122. A countershaft support bracket 128 is connected to a left side of the bulkhead 126. The countershaft support bracket 128 has an opening 130 to receive and support a left end portion of the countershaft 100. The front sub-frame 116, the right and left side walls 118, 120, the engine compartment bottom 122, the bulkhead 126, and the countershaft support bracket 128 are preferably made from bent sheet metal or by casting, and are preferably connected to each other by fasteners such as rivets or bolts. As seen in FIGS. 2 to 6, the engine 24 is disposed longitudinally between the front sub-frame 116 and the bulkhead 126, and transversely between the right and left side walls 118, 120 such that the mass of the power pack 102 is transversely balanced.

The upper portion of the engine compartment 20 has a front cross-member 132 which extends transversely from one suspension mounting bracket 124 to the other. A pair of front braces 134 extend upwardly and rearwardly from the pair of suspension mounting brackets 124 to a steering bracket 136. The steering bracket 136 is aligned with the longitudinal centerline 61 of the snowmobile 10 and has an opening therein to receive the steering column 34. A rear cross-member 138 extends transversely from the upper end of the countershaft support bracket 128 to the reduction gearing 78. A pair of columns 140 extend from the ends of the rear cross-member 138 to the steering bracket 136. A pair of rear braces 142 extend rearwardly from the steering bracket to a top of the tunnel 18. The front braces 134, the columns 140, and rear braces 142 form together a pyramidal-like structure which enhances the torsional and structural rigidity of the frame 16. The front cross-member 132, the front braces 134, the rear cross-member 138, the columns 140, and the rear braces 142 are preferably made of aluminum tubing, but other structures and materials are also contemplated.

A first member of the family of snowmobiles has the features of the snowmobile 10 described above, a power pack configuration corresponding to the configuration of power pack 102 described above, and a frame 16A. The frame 16A has an engine compartment configuration corresponding to the engine compartment 20 described above and a tunnel 18A disposed rearward of the engine compartment 20. The frame 16A will now be described with respect to FIGS. 2 to 9.

Figure 7:
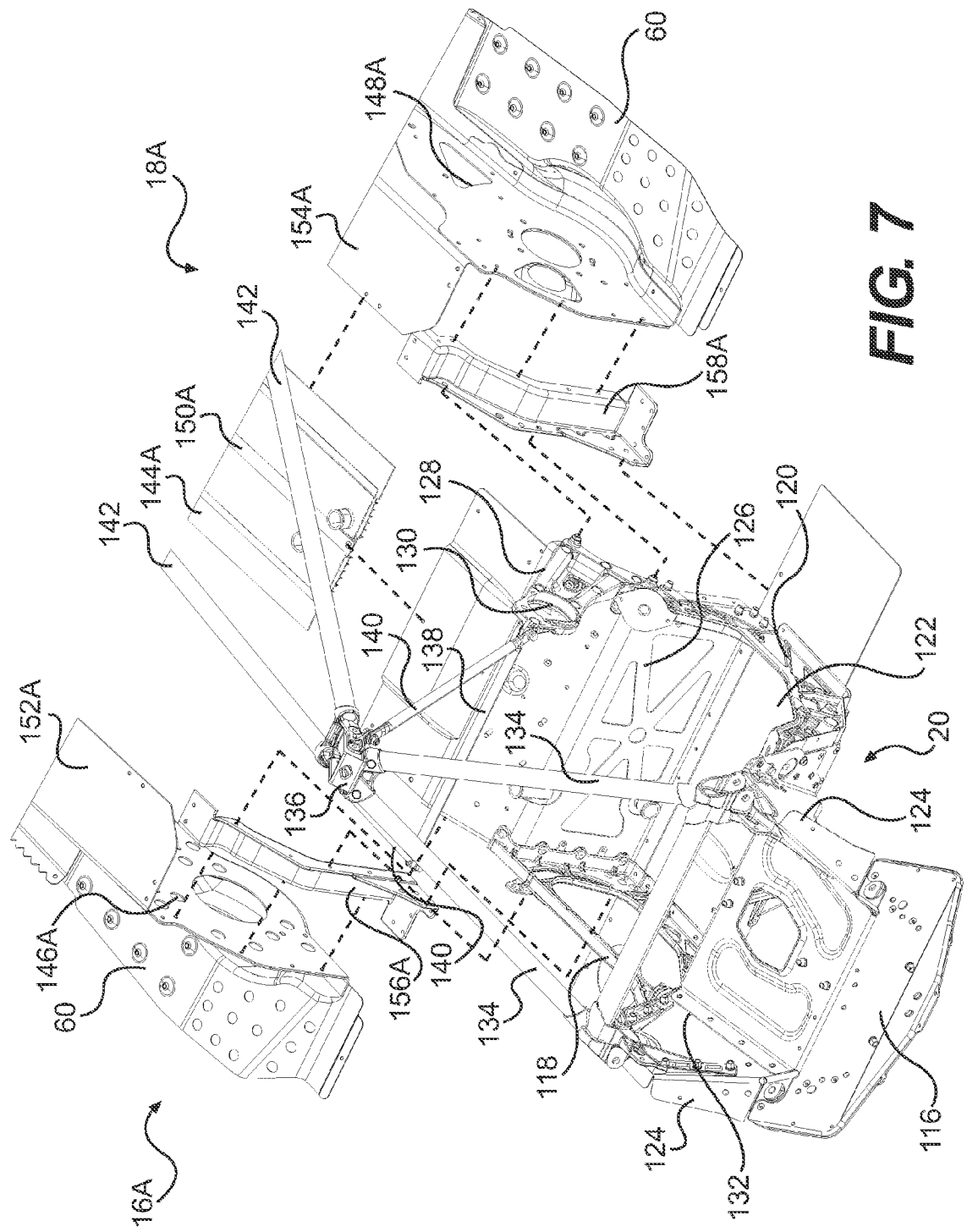
FIG. 7 is an exploded view of the forward portion of the first frame of FIG. 2.

As best seen in FIG. 7, the tunnel 18A of frame 16A is made of three parts. The tunnel 18A has a central tunnel portion 144A, a right side tunnel portion 146A, and a left side tunnel portion 148A. The central tunnel portion 144A is disposed generally horizontally and has an integrated heat exchanger 150A which is used to cool the engine coolant. It is contemplated that the heat exchanger 150A could be fastened to a bottom of the central tunnel portion 144A or could be disposed elsewhere on the frame 16A. The front portion of the central tunnel portion 144 is connected to a rear portion of the bulkhead 126 via fasteners. It is contemplated that the front portion of the central tunnel portion 144 could alternatively be connected to a rear portion of the bulkhead 126 by welding. The right and left side tunnel portions 146A, 148A are disposed generally vertically and each have a footrest 60 extending outwardly from a bottom portion thereof. The right side tunnel portion 146A has a right side horizontal flange 152A which connects the right side tunnel portion 146A to a right side of the central tunnel portion 144A. Similarly, the left side tunnel portion 148A has a left side horizontal flange 154A that connects the left side tunnel portion 148A to a left side of the central tunnel portion 144A. The right and left side horizontal flanges 152A, 154A are fastened to the central frame portion 144A at a certain distance from the longitudinal centerline 61 of the snowmobile 10 such that the tunnel 18A has a tunnel width W1 (FIG. 6) which can accommodate the width of the endless track 65 for which the frame 16A is designed. The tunnel width is measured directly below the central tunnel portion 144 perpendicularly to the longitudinal centerline 61 from the inside of the right tunnel side portion 146 to the inside of the left tunnel side portion 148. In the event that the tunnel 18 has a non uniform width along its length, the tunnel width is to be measured directly above the front drive axle 90. For exemplary purposes only and to provide a reference with respect to the other tunnels 18B and 18C, the tunnel 18A could accommodate an endless track 65 having a width of 50.8 cm (20 inches). Since the tunnel 18A has a width W1 which is greater than the width of the engine compartment 20, right and left spacers 156A and 158A, respectively, are provided in order to connect the tunnel 18A to the sides of the engine compartment 20. The right spacer 156A is inserted between the right tunnel side portion 146A and a right side of the engine compartment 20 and is fastened to each of them. Similarly, the left spacer 158A is inserted between the left tunnel side portion 148A and a left side of the engine compartment 20 and is fastened to each of them.

Figure 8:
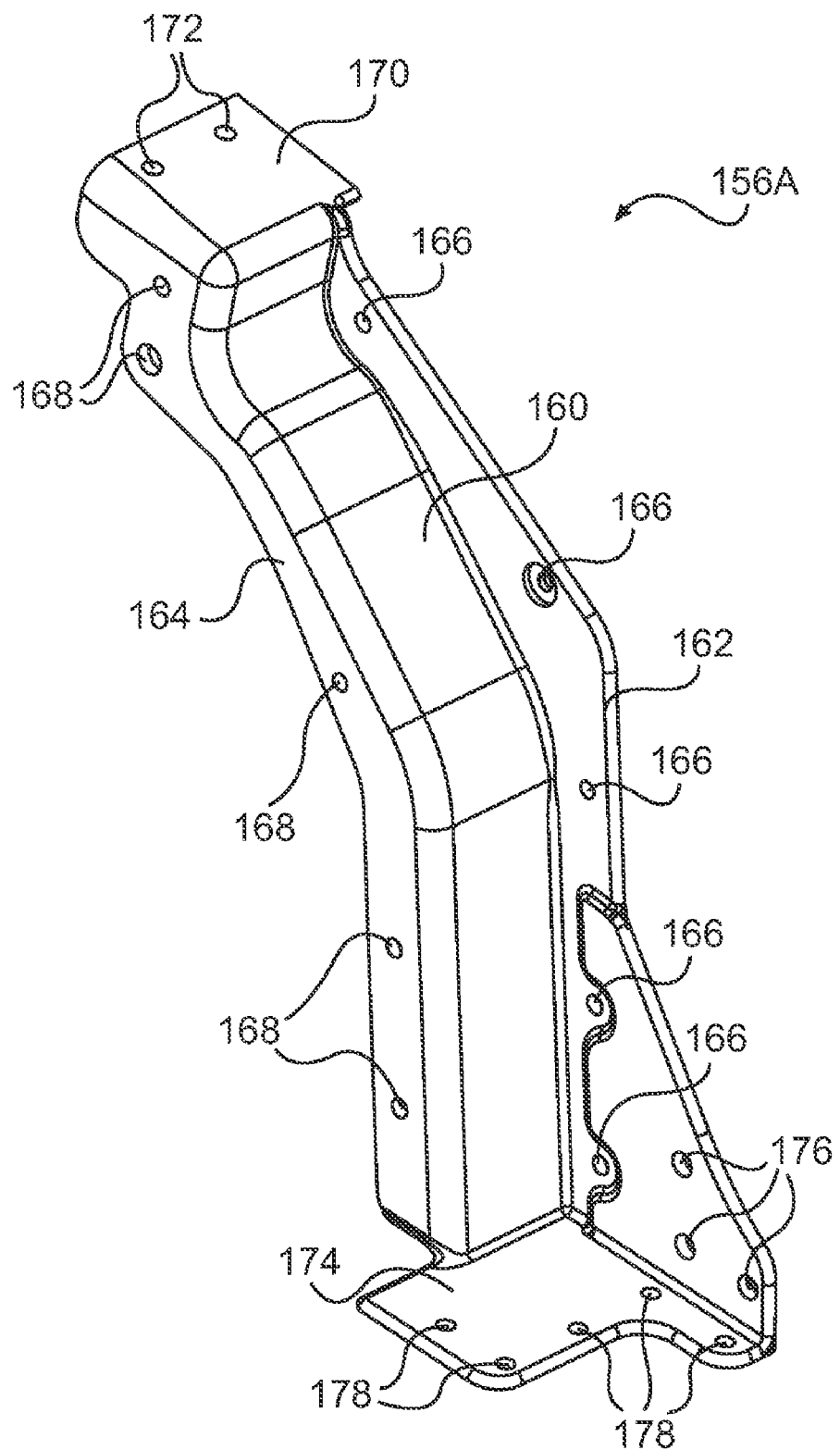
FIG. 8 is a perspective view of a right spacer of the first frame of FIG. 2.

Turning now to FIG. 8, the right spacer 156A will now be described. The right spacer 156A has a central spacer portion 160, an inner flange 162, and an outer flange 164. The width of the central spacer portion 160 is selected such that the width of the right spacer 156A corresponds to the distance between the right tunnel side portion 146A and the right side of the engine compartment 20. The inner flange 162 provides fastener openings 166 to receive the fasteners which fasten the right spacer 156A to the right side of the engine compartment 20. The outer flange 164 provides fastener openings 168 to receive the fasteners which fasten the right spacer 156A to the right side tunnel portion 146A. The profiles of the central spacer portion 160, the inner flange 162, and the outer flange 164 are selected to correspond to the profiles of the portions of the engine compartment 20 and right side tunnel portion 146A to which the right spacer 156A is fastened. An upper flange 170 is provided at a top of the central spacer portion 160 to provide fastener openings 172 to receive the fasteners which fasten the right spacer 156A to the right side horizontal flange 152A. An L-shaped bracket 174 is provided at a bottom of the central spacer portion 160 to provide additional fastener openings 176 to receive additional fasteners which fasten the right spacer 156A to the right side of the engine compartment 20 and to provide fastener openings 178 to receive fasteners which fasten the right spacer 156A to the portion of the engine compartment bottom 122 which extends beyond the right side wall 118 of the engine compartment 20. This embodiment of the right spacer 156A is preferred as it solidly connects the right side tunnel portion 146A and the right side of the engine compartment 20 and completely fills the space therebetween. However, other constructions of the right spacer 156A are contemplated. For example, the right spacer 156A could consist of one or more brackets which link the right side tunnel portion 146A and the right side of the engine compartment 20.

Figure 9:
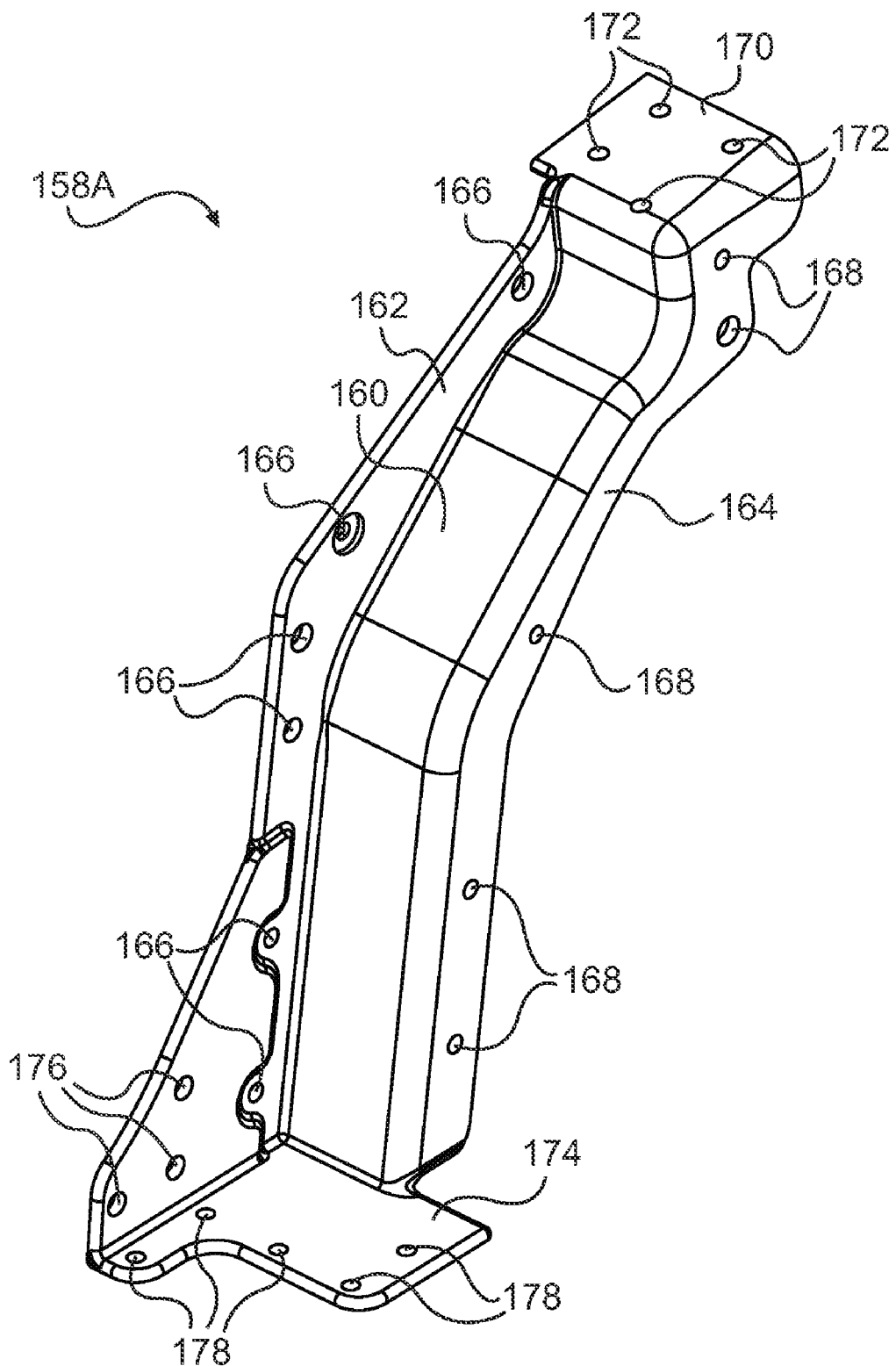
FIG. 9 is a perspective view of a left spacer of the first frame of FIG. 2.

FIG. 9 illustrates the left spacer 158A. The left spacer 158A is substantially a mirror image of the right spacer 156A. Therefore, like elements have been labeled with the same reference numerals and the left spacer 158A will not be described in detail. It should be understood that the description of the right spacer 156A when applied to the left spacer 158A would refer to the elements disposed on the left side of the frame 16A (i.e. the left side tunnel portion 148A, the left side of the engine compartment 20, etc.).

A second member of the family of snowmobiles has the features of the snowmobile 10 described above, a power pack configuration corresponding to the configuration of power pack 102 described above, and a frame 16B. The frame 16B has an engine compartment configuration corresponding to the engine compartment 20 described above and a tunnel 18B disposed rearward of the engine compartment 20. The frame 16B will now be described with respect to FIGS. 10 to 12.

The tunnel 18B of frame 16B is also made of three parts. The tunnel 18B has a central tunnel portion 144B, a right side tunnel portion 146B, and a left side tunnel portion 148B which have the same physical characteristics as the central tunnel portion 144A, the right side tunnel portion 146A, and the left side tunnel portion 148A, and will therefore not be described again. The main difference between the tunnel 18B and the tunnel 18A, is that the right and left side horizontal flanges 152B, 154B of the right and left side tunnel portions 146B and 148B are fastened to the central frame portion 144B at a shorter distance from the longitudinal centerline 61 of the snowmobile 10 than in tunnel 18A. Therefore, the tunnel 18B has a tunnel width W2 (FIG. 10) which can accommodate the width of the endless track 65 for which the frame 16B is designed, which is less than the width of the endless track 65 for which the frame 16A is designed. For exemplary purposes only and to provide a reference with respect to the other tunnels 18A and 18C, the tunnel 18B could accommodate an endless track 65 having a width of 38.1 cm (15 inches). Since the tunnel 18B has a width W2 which substantially the same as the width of the engine compartment 20, the right and left side tunnel portions 146B and 148B are directly fastened to their corresponding sides of the engine compartment 20. Thus, no spacers are required in the construction of frame 16B.

A third member of the family of snowmobiles has the features of the snowmobile 10 described above, a power pack configuration corresponding to the configuration of power pack 102 described above, and a frame 16C. The frame 16C has an engine compartment configuration corresponding to the engine compartment 20 described above and a tunnel 18C disposed rearward of the engine compartment 20. The frame 16C will now be described with respect to FIGS. 13 to 19.

The tunnel 18C of frame 16C is also made of three parts. The tunnel 18C has a central tunnel portion 144C, a right side tunnel portion 146C, and a left side tunnel portion 148C which have the same physical characteristics as the central tunnel portion 144A, the right side tunnel portion 146A, and the left side tunnel portion 148A, and will therefore not be described again. The main difference between the tunnel 18C and the tunnel 18A, is that the right and left side horizontal flanges 152C, 154C of the right and left side tunnel portions 146C and 148C are fastened to the central frame portion 144C at a greater distance from the longitudinal centerline 61 of the snowmobile 10 than in tunnel 18A. Therefore, the tunnel 18C has a tunnel width W3 (FIG. 14) which can accommodate the width of the endless track 65 for which the frame 16C is designed, which is greater than the width of the endless track 65 for which the frame 16A is designed. For exemplary purposes only and to provide a reference with respect to the other tunnels 18A and 18B, the tunnel 18C could accommodate an endless track 65 having a width of 61 cm (24 inches). Since the tunnel 18C has a width W3 which is greater than the width of the engine compartment 20, right and left spacers 156C and 158C, respectively, are provided in order to connect the tunnel 18C to the sides of the engine compartment 20. The right spacer 156C is inserted between the right tunnel side portion 146C and a right side of the engine compartment 20 and is fastened to each of them. Similarly, the left spacer 158C is inserted between the left tunnel side portion 148C and a left side of the engine compartment 20 and is fastened to each of them.

Figure 18:
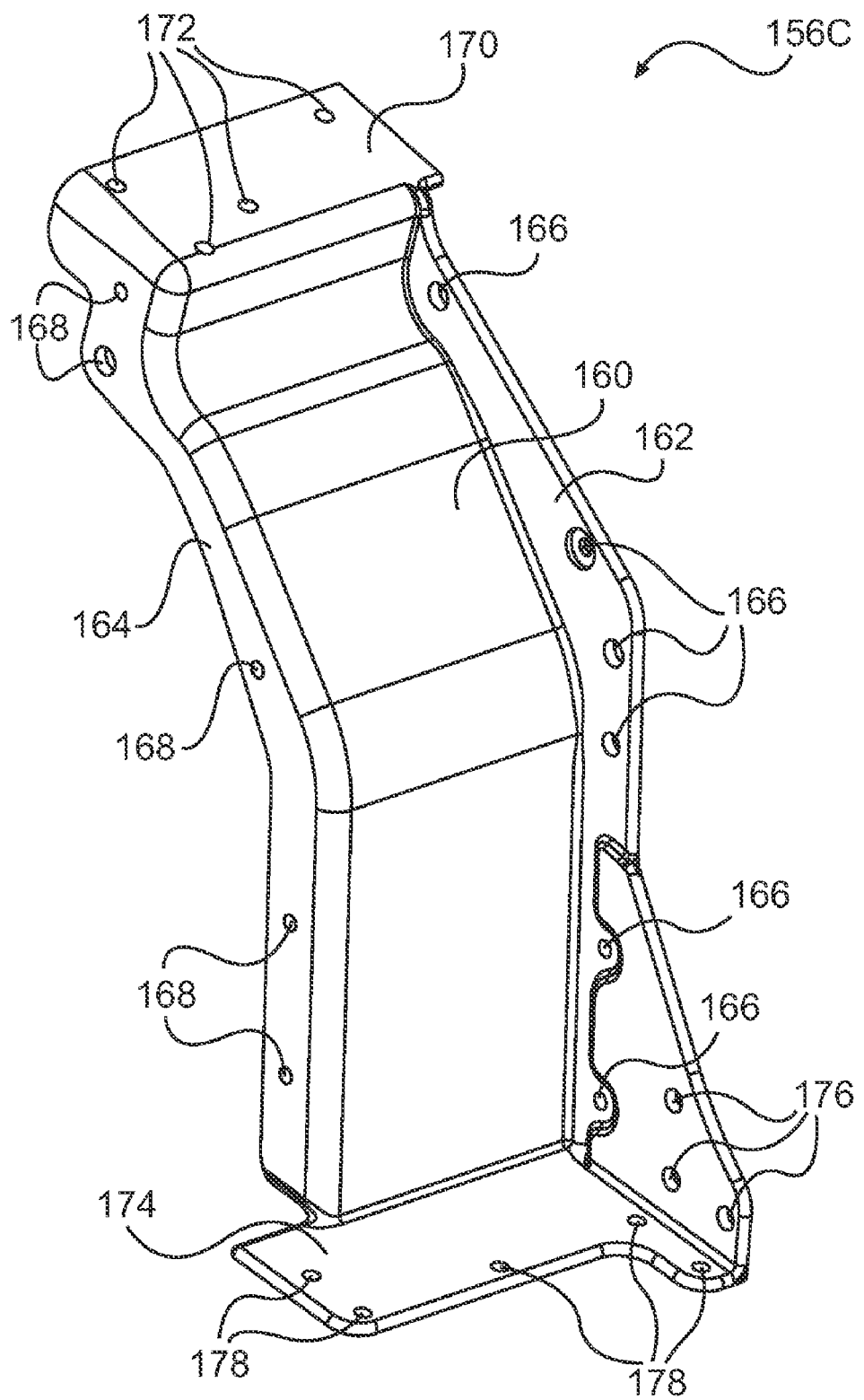
FIG. 18 is a perspective view of a right spacer of the third frame of FIG. 13.
Figure 19:
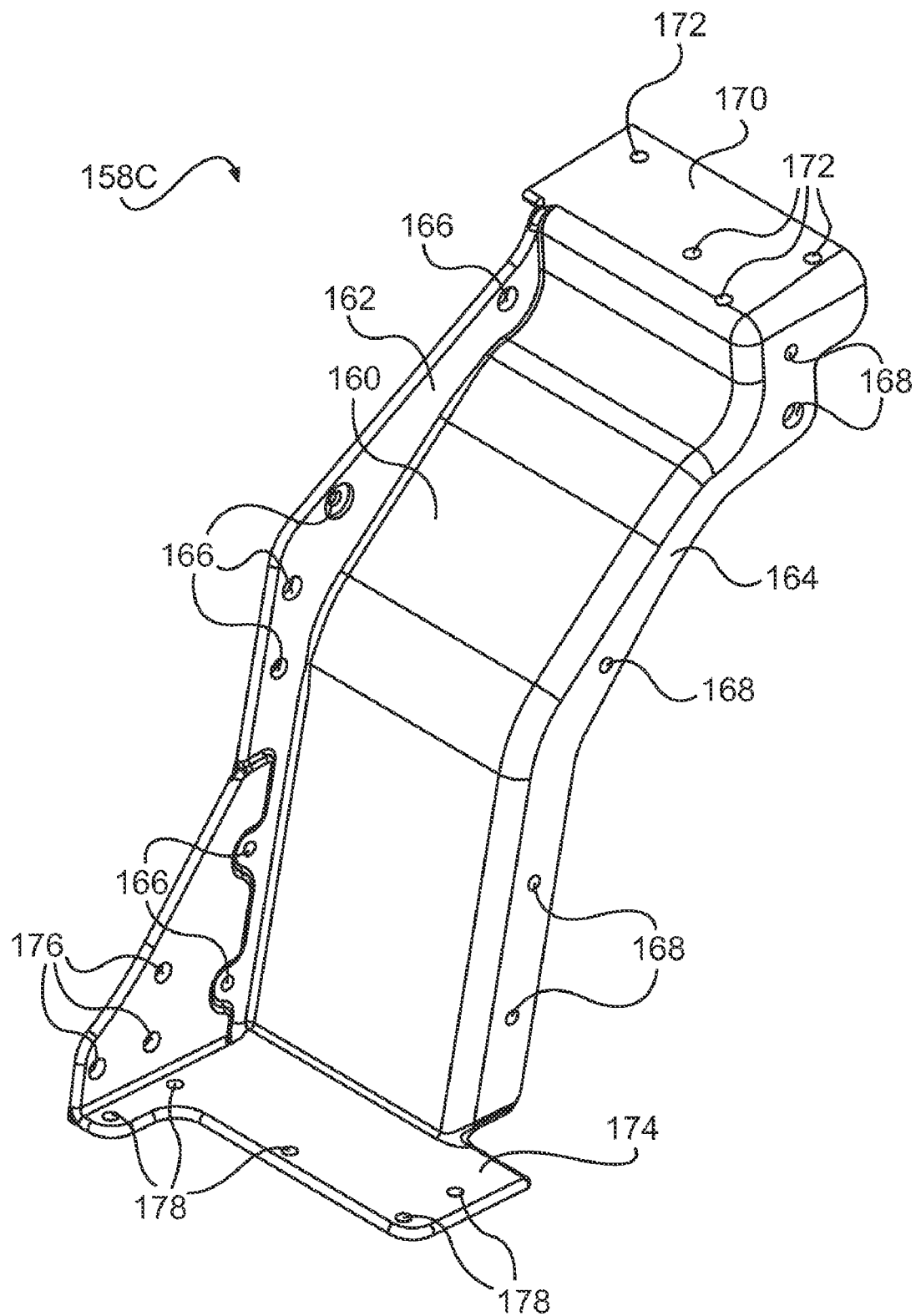
FIG. 19 is a perspective view of a left spacer of the third frame of FIG. 13.

FIGS. 18 and 19 illustrate the right and left spacers 156C and 158C respectively. The spacers 156C and 158C have substantially the same physical characteristics as the spacers 156A and 158A respectively. The main difference is that the spacers 156C and 158C are wider than the spacers 156A and 158A since the distance between the right and left tunnel side portions 146C and 148C and the engine compartment 20 in frame 16C is greater than a corresponding distance in frame 16A. Therefore, like elements have been labeled with the same reference numerals and the spacers 156C and 158C will not be described in detail.

Although not described, it should be understood that other members of the family of snowmobiles are contemplated which could be designed with other tunnel widths by applying the teachings of the present application.

As should be apparent from the above description, the tunnels 18A, 18B, and 18C can be manufactured by using three common parts (central portion 144, right side tunnel portion 146, and left side tunnel portion 148). The different tunnel widths are obtained by connecting the tunnel side portions 146, 148 to the central tunnel portion 144 closer or farther away from the longitudinal centerline 61 to obtain the desired width. Appropriately sized spacers 156, 158 are then inserted, as necessary, between the tunnel 18 and the sides of the engine compartment 20 to complete the assembly of the frame 16. As would be understood by those skilled in the art, having common parts is advantageous as it reduces manufacturing cost. It is contemplated that the tunnel 18 of each frame 16 could also be made of two or more than three parts. It is also contemplated that each tunnel 18A, 18B, and 18C could each be made of a single part each having a different tunnel width.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A system for assembling a family of snowmobiles comprising:
    first components for assembling a first snowmobile, the first components including:
        a first frame, the first frame including:
            a first engine compartment, the first engine compartment having an engine compartment configuration; and
            a first tunnel rearward of the first engine compartment, the first tunnel having a first tunnel width;
        a first engine;
        a first countershaft;
        a first continuously variable transmission (CVT);
        a first reduction gearing;
        a first endless drive track; and
        a first pair of skis; and
    second components for assembling a second snowmobile, the second components including:
        a second frame, the second frame including:
            a second engine compartment, the second engine compartment having the engine compartment configuration; and
            a second tunnel rearward of the second engine compartment, the second tunnel having a second tunnel width being greater than the first tunnel width;
        a second engine;
        a second countershaft;
        a second CVT;
        a second reduction gearing;
        a second endless drive track; and
        a second pair of skis;
    wherein when the first snowmobile is assembled using the first components:
        the first engine is disposed in the first engine compartment;
        the first countershaft traverses the first engine compartment, and a distance from a longitudinal centerline of the snowmobile to an end of the first countershaft being more than half the first tunnel width, the end of the first countershaft being on a first side of the first engine;
        the first CVT operatively connects the first engine with the first countershaft, and the first CVT is disposed on the first side of the first engine;
        the first reduction gearing is operatively connected to the first countershaft on a second side of the first engine opposite the first side;
        the first endless drive track is disposed below the first tunnel for propelling the first snowmobile, and the first endless drive track is operatively connected to the first reduction gearing; and
        the first pair of skis is operatively connected to the first frame; and
    wherein when the second snowmobile is assembled using the second components:
        the second engine is disposed in the second engine compartment;
        the second countershaft traverses the second engine compartment, and a distance from the longitudinal centerline of the snowmobile to an end of the second countershaft being less than half the second tunnel width, the end of the second countershaft being on a first side of the second engine;
        the second CVT operatively connects the second engine and the second countershaft, and the second CVT is disposed on the first side of the second engine;
        the second reduction gearing is operatively connected to the second countershaft on a second side of the second engine opposite the first side;
        the second endless drive track is disposed below the second tunnel for propelling the second snowmobile, and the second endless drive track is operatively connected to the second reduction gearing; and
        the second pair of skis is operatively connected to the second frame.

2. The system of claim 1, wherein the first engine has engine physical characteristics and the second engine has the engine physical characteristics;
    wherein the first countershaft has countershaft physical characteristics and the second countershaft has the countershaft physical characteristics;
    wherein the first CVT has CVT physical characteristics and the second CVT has the CVT physical characteristics; and
    wherein the first reduction gearing has reduction gearing physical characteristics and the second reduction gearing has the reduction gearing physical characteristics.

3. The system of claim 2, wherein the first engine, the first countershaft, the first CVT, and the first reduction gearing are disposed in a power pack configuration relative to the first engine compartment when the first snowmobile is assembled using the first components; and
    wherein the second engine, the second countershaft, the second CVT, and the second reduction gearing are disposed in the power pack configuration relative to the second engine compartment when the second snowmobile is assembled using the second components.

4. The system of claim 1, wherein the first endless drive track has a first track width; and
    wherein the second endless drive track has a second track width being greater than the first track width.

5. The system of claim 1, wherein the second components further include:
    a first spacer; and
    a second spacer;
    wherein when the second snowmobile is assembled using the second components:

the first spacer is disposed between the second tunnel and a first side of the second engine compartment, and the first spacer connects the second tunnel to the first side of the second engine compartment; and the second spacer is disposed between the second tunnel and a second side of the second engine compartment, and the second spacer connects the second tunnel to the second side of the second engine compartment.

6. The system of claim 5, wherein the second tunnel includes:
   a central tunnel portion having a first side and a second side;
   a first tunnel side portion fastened to the first side of the central tunnel portion; and
   a second tunnel side portion fastened to the second side of the central tunnel portion.

7. The system of claim 6, wherein the central tunnel portion comprises a heat exchanger.

8. The system of claim 6, wherein when the second snowmobile is assembled using the second components:
   the first spacer is disposed between the first tunnel side portion and the first side of the second engine compartment; and
   the second spacer is disposed between the second tunnel side portion and the second side of the second engine compartment.

9. The system of claim 1, wherein the first CVT has a driven pulley, and when the first snowmobile is assembled using the first components the driven pulley of the first CVT is disposed vertically higher than the first tunnel; and
   wherein the second CVT has a driven pulley, and when the second snowmobile is assembled using the second components the driven pulley of the second CVT is disposed vertically higher than the second tunnel.

10. A snowmobile comprising:
   an engine compartment having an engine compartment configuration;
   one of a first tunnel and a second tunnel, the one of the first tunnel and the second tunnel being connected to the engine compartment and disposed rearward of the engine compartment, the first tunnel having a first tunnel width, the second tunnel having a second tunnel width, the second tunnel width being greater than the first tunnel width, the engine compartment being configured to connect to either one of the first tunnel and the second tunnel;
   an engine disposed in the engine compartment, a position of the engine in the engine compartment being the same regardless of which one of the first tunnel and the second tunnel is connected to the engine compartment;
   a countershaft traversing the engine compartment, a distance from a longitudinal centerline of the snowmobile to an end of the countershaft being more than half the first tunnel width and less than half the second tunnel width;
   an endless drive track disposed below the one of the first tunnel and the second tunnel for propelling the snowmobile, the first endless drive track being operatively connected to the engine; and
   a pair of skis operatively connected to the engine compartment.

11. The snowmobile of claim 10, further comprising:
   a continuously variable transmission (CVT) operatively connecting the engine with the countershaft, the CVT being disposed on a first side of the engine.

12. The snowmobile of claim 11, further comprising a reduction gearing operatively connected to the countershaft on a second side of the engine opposite the first side;
   wherein the endless drive track is operatively connected to the first reduction gearing.

13. The snowmobile of claim 10, wherein the one of the first tunnel and the second tunnel is the second tunnel;
   wherein the snowmobile further comprises:
      a first spacer disposed between the second tunnel and a first side of the engine compartment, the first spacer connecting the second tunnel to the first side of the engine compartment; and
      a second spacer disposed between the second tunnel and a second side of the engine compartment, the second spacer connecting the second tunnel to the second side of the engine compartment.

14. A system for assembling a family of snowmobiles comprising:
   first components for assembling a first snowmobile, the first components including:
      a first frame, the first frame including:
         a first engine compartment, the first engine compartment having an engine compartment configuration; and
         a first tunnel rearward of the first engine compartment, the first tunnel having a first tunnel width;
      a first engine;
      a first countershaft;
      a first continuously variable transmission (CVT);
      a first reduction gearing;
      a first endless drive track; and
      a first pair of skis; and
   second components for assembling a second snowmobile, the second components including:
      a second frame, the second frame including:
         a second engine compartment, the second engine compartment having the engine compartment configuration; and
         a second tunnel rearward of the second engine compartment, the second tunnel having a second tunnel width being greater than the first tunnel width;
      a second engine;
      a second countershaft;
      a second CVT;
      a second reduction gearing;
      a second endless drive track;
      a second pair of skis;
      a first spacer; and
      a second spacer;
   wherein when the first snowmobile is assembled using the first components:
      the first engine is disposed in the first engine compartment;
      the first countershaft traverses the first engine compartment;
      the first CVT operatively connects the first engine with the first countershaft, and the first CVT is disposed on a first side of the first engine;
      the first reduction gearing is operatively connected to the first countershaft on a second side of the first engine opposite the first side;
      the first endless drive track is disposed below the first tunnel for propelling the first snowmobile, and the first endless drive track is operatively connected to the first reduction gearing; and
      the first pair of skis is operatively connected to the first frame; and wherein when the second snowmobile is assembled using the second components:
- the second engine is disposed in the second engine compartment;
- the second countershaft traverses the second engine compartment;
- the second CVT operatively connects the second engine and the second countershaft, and the second CVT is disposed on a first side of the second engine;
- the second reduction gearing is operatively connected to the second countershaft on a second side of the second engine opposite the first side;
- the second endless drive track is disposed below the second tunnel for propelling the second snowmobile, and the second endless drive track is operatively connected to the second reduction gearing;
- the second pair of skis is operatively connected to the second frame;
- the first spacer is disposed between the second tunnel and a first side of the second engine compartment, and the first spacer connects the second tunnel to the first side of the second engine compartment; and
- the second spacer is disposed between the second tunnel and a second side of the second engine compartment, and the second spacer connects the second tunnel to the second side of the second engine compartment.

15. The system of claim 14, wherein the first engine has engine physical characteristics and the second engine has the engine physical characteristics;
wherein the first countershaft has countershaft physical characteristics and the second countershaft has the countershaft physical characteristics;
wherein the first CVT has CVT physical characteristics and the second CVT has the CVT physical characteristics; and
wherein the first reduction gearing has reduction gearing physical characteristics and the second reduction gearing has the reduction gearing physical characteristics.

16. The system of claim 15, wherein the first engine, the first countershaft, the first CVT, and the first reduction gearing are disposed in a power pack configuration relative to the first engine compartment when the first snowmobile is assembled using the first components; and
wherein the second engine, the second countershaft, the second CVT, and the second reduction gearing are disposed in the power pack configuration relative to the second engine compartment when the second snowmobile is assembled using the second components.

17. The system of claim 14, wherein the second tunnel includes:
- a central tunnel portion having a first side and a second side;
- a first tunnel side portion fastened to the first side of the central tunnel portion; and
- a second tunnel side portion fastened to the second side of the central tunnel portion.

18. The system of claim 17, wherein the central tunnel portion comprises a heat exchanger.

19. The system of claim 17, wherein when the second snowmobile is assembled using the second components:
- the first spacer is disposed between the first tunnel side portion and the first side of the second engine compartment; and
- the second spacer is disposed between the second tunnel side portion and the second side of the second engine compartment.

20. The system of claim 14, wherein the first CVT has a driven pulley, and when the first snowmobile is assembled using the first components the driven pulley of the first CVT is disposed vertically higher than the first tunnel; and
wherein the second CVT has a driven pulley, and when the second snowmobile is assembled using the second components the driven pulley of the second CVT is disposed vertically higher than the second tunnel.

* * * * *